United States Patent
Cezanne et al.

(10) Patent No.: US 12,047,147 B2
(45) Date of Patent: Jul. 23, 2024

(54) ENHANCED LINE-OF-SIGHT COMMUNICATIONS WITH ANALOG MULTI-PATH BEAMFORMING

(71) Applicant: QUALCOMM Incorporated, San Diego, CA (US)

(72) Inventors: Juergen Cezanne, Ocean Township, NJ (US); Meilong Jiang, Westfield, NJ (US); Ahmed Bedewy, Hillsborough, NJ (US); Ashwin Sampath, Skillman, NJ (US); Ori Shental, Marlboro, NJ (US); Tianyang Bai, Somerville, NJ (US); Ozge Koymen, Princeton, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 18/063,964

(22) Filed: Dec. 9, 2022

(65) Prior Publication Data
US 2024/0195476 A1  Jun. 13, 2024

(51) Int. Cl.
*H04B 7/06* (2006.01)
*H04B 7/0456* (2017.01)
(Continued)

(52) U.S. Cl.
CPC ......... *H04B 7/0626* (2013.01); *H04B 7/0486* (2013.01); *H04W 28/0215* (2013.01); *H04W 72/54* (2023.01); *H04W 76/15* (2018.02)

(58) Field of Classification Search
CPC ... H04B 7/0626; H04B 7/0486; H04W 76/15; H04W 72/54; H04W 28/0215
See application file for complete search history.

(56) References Cited

U.S. PATENT DOCUMENTS 11,394,437 B2 * 7/2022 Raghavan ............... H04B 7/088
2018/0183639 A1 * 6/2018 Mueck .................... H04L 27/12
(Continued)

FOREIGN PATENT DOCUMENTS

EP         2847957 B1    3/2020
WO   WO-2020228965 A1   11/2020

OTHER PUBLICATIONS

International Search Report and Written Opinion—PCT/US2023/080019—ISA/EPO—Mar. 15, 2024.

*Primary Examiner* — Jaison Joseph
(74) *Attorney, Agent, or Firm* — Holland & Hart LLP

(57) ABSTRACT

Methods, systems, and devices for wireless communications supporting techniques for enhanced line-of-sight (LOS) communications with analog multi-path beamforming are described. A first wireless device may receive, from a second wireless device, an indication of a capability of the second wireless device to concurrently transmit first signaling in a first analog beamforming direction using a first transmission configuration indicator (TCI) state corresponding to a LOS mode, and second signaling in a second analog beamforming direction using a second TCI state corresponding to an indirect LOS mode. The first wireless device may then receive, from the second wireless device, a first downlink message in the first analog beamforming direction using the first TCI state concurrently with a second downlink message in the second analog beamforming direction using the second TCI state.

30 Claims, 17 Drawing Sheets

(51) Int. Cl.
*H04W 28/02* (2009.01)
*H04W 72/54* (2023.01)
*H04W 76/15* (2018.01)

(56) References Cited

U.S. PATENT DOCUMENTS

| | | |
|---|---|---|
| 2021/0050892 A1* | 2/2021 | Park .................... H04L 5/0048 |
| 2021/0075526 A1* | 3/2021 | Pefkianakis ......... H04B 17/336 |
| 2021/0184744 A1* | 6/2021 | Pezeshki ............... H04L 5/0023 |
| 2021/0194551 A1* | 6/2021 | Raghavan ............ H04B 7/0665 |
| 2022/0029679 A1* | 1/2022 | Pezeshki ............... H04B 7/0628 |

\* cited by examiner

ENHANCED LINE-OF-SIGHT COMMUNICATIONS WITH ANALOG MULTI-PATH BEAMFORMING

FIELD OF TECHNOLOGY

The following relates to wireless communications, including enhanced line-of-sight (LOS) communications with analog multi-path beamforming.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Wireless devices may communicate in line-of-sight (LOS) scenarios, where antennas are orthogonally polarized and spatially separated from one another at transmitting and receiving devices, thus supporting spatially separate beamforming paths for wireless communications. In some implementations, however, obstructions between one wireless device and another wireless device may reduce the effectiveness of LOS communications.

SUMMARY

The described techniques relate to improved methods, systems, devices, and apparatuses that support enhanced line-of-sight (LOS) communications with analog multi-path beamforming. For example, the described techniques provide for the use of one or more non-line-of-sight (NLOS) (e.g., indirect LOS) beamforming paths in addition to a LOS beamforming path, which may increase the number of beamforming directions available at a wireless device to improve the performance of a LOS-MIMO system. For example, at least one antenna panel of a wireless device supporting LOS-MIMO may form a beam that is directed in an NLOS path. In such examples, the wireless device may support a multi-panel antenna array to perform multi-path analog beamforming (e.g., aperture waveform coding (AWC)) to obtain both LOS and NLOS paths gains. For example, antenna elements may be bundled into several panels at both the receiving and transmitting devices, where one or more antenna panels support either LOS beamforming or NLOS beamforming.

In such implementations, a receiving device may receive a capability indication from a transmitting device which indicates a capability of the transmitting device to concurrently transmit first signaling in a first (e.g., LOS) direction using a first transmission configuration indicator (TCI) state, and in a second (e.g., NLOS) direction using a second TCI state. The receiving device may then receive one or more downlink messages from the transmitting device using the first and second TCI states in respective LOS and NLOS directions.

A method for wireless communication at a first wireless device is described. The method may include receiving, from a second wireless device, an indication of a capability of the second wireless device to concurrently transmit first signaling in a first analog beamforming direction using a first TCI state corresponding to a LOS mode, and second signaling in a second analog beamforming direction using a second TCI state corresponding to an indirect LOS mode and receiving, from the second wireless device, a first downlink message in the first analog beamforming direction using the first TCI state concurrently with a second downlink message in the second analog beamforming direction using the second TCI state.

An apparatus for wireless communication at a first wireless device is described. The apparatus may include a processor, memory coupled with the processor, and instructions stored in the memory. The instructions may be executable by the processor to cause the apparatus to receive, from a second wireless device, an indication of a capability of the second wireless device to concurrently transmit first signaling in a first analog beamforming direction using a first TCI state corresponding to a LOS mode, and second signaling in a second analog beamforming direction using a second TCI state corresponding to an indirect LOS mode (e.g., NLOS) and receive, from the second wireless device, a first downlink message in the first analog beamforming direction using the first TCI state concurrently with a second downlink message in the second analog beamforming direction using the second TCI state.

Another apparatus for wireless communication at a first wireless device is described. The apparatus may include means for receiving, from a second wireless device, an indication of a capability of the second wireless device to concurrently transmit first signaling in a first analog beamforming direction using a first TCI state corresponding to a LOS mode, and second signaling in a second analog beamforming direction using a second TCI state corresponding to an indirect LOS mode and means for receiving, from the second wireless device, a first downlink message in the first analog beamforming direction using the first TCI state concurrently with a second downlink message in the second analog beamforming direction using the second TCI state.

A non-transitory computer-readable medium storing code for wireless communication at a first wireless device is described. The code may include instructions executable by a processor to receive, from a second wireless device, an indication of a capability of the second wireless device to concurrently transmit first signaling in a first analog beamforming direction using a first TCI state corresponding to a LOS mode, and second signaling in a second analog beamforming direction using a second TCI state corresponding to an indirect LOS mode and receive, from the second wireless device, a first downlink message in the first analog beamforming direction using the first TCI state concurrently with a second downlink message in the second analog beamforming direction using the second TCI state.

Some examples of the method, apparatuses, and non-transitory computer-readable medium described herein may further include operations, features, means, or instructions for transmitting, to the second wireless device, a channel state information (CSI) feedback message including one or more parameters associated with the first analog beamforming direction, the second analog beamforming direction, or both, where a first quantity of antenna panels associated with the LOS mode and a second quantity of antenna panels associated with the indirect LOS mode may be based on the one or more parameters.

In some examples of the method, apparatuses, and non-transitory computer-readable medium described herein, the one or more parameters include a received signal strength measurement, a channel rank parameter corresponding to the first analog beamforming direction and the second analog beamforming direction, a link reliability parameter corresponding to the first analog beamforming direction and the second analog beamforming direction, or any combination thereof.

In some examples of the method, apparatuses, and non-transitory computer-readable medium described herein, the first downlink message includes a first demodulation reference signal (DMRS) and the second downlink message includes a second DMRS and the method, apparatuses, and non-transitory computer-readable medium may include further operations, features, means, or instructions for receiving a TCI message including quasi-colocation information that indicates the first analog beamforming direction and the second analog beamforming direction and receiving, based on the TCI message, the first DMRS on a downlink data channel in the first analog beamforming direction, and the second DMRS on the downlink data channel in the second analog beamforming direction.

In some examples of the method, apparatuses, and non-transitory computer-readable medium described herein, receiving the first DMRS and the second DMRS may include operations, features, means, or instructions for receiving the first DMRS via a first DMRS port and the second DMRS via a second DMRS port based on the TCI message.

In some examples of the method, apparatuses, and non-transitory computer-readable medium described herein, the first DMRS port may be associated with a first set of DMRS ports corresponding to the first analog beamforming direction of the LOS mode and the second DMRS port may be associated with a second set of DMRS ports corresponding to the second analog beamforming direction of the indirect LOS mode.

Some examples of the method, apparatuses, and non-transitory computer-readable medium described herein may further include operations, features, means, or instructions for transmitting, to the second wireless device, a first uplink message in the first analog beamforming direction and a second uplink message in the second analog beamforming direction based on the TCI message.

Some examples of the method, apparatuses, and non-transitory computer-readable medium described herein may further include operations, features, means, or instructions for transmitting, to the second wireless device, an indication of a first quantity of antenna panels available for communicating with the second wireless device in the first analog beamforming direction and a second quantity of antenna panels available for communicating with the second wireless device in the second analog beamforming direction.

In some examples of the method, apparatuses, and non-transitory computer-readable medium described herein, receiving the first downlink message in the first analog beamforming direction concurrently with the second downlink message in the second analog beamforming direction may include operations, features, means, or instructions for receiving the first downlink message via a first set of multiple antenna elements corresponding to the LOS mode and the second downlink message via a second set of multiple antenna elements corresponding to the indirect LOS mode.

In some examples of the method, apparatuses, and non-transitory computer-readable medium described herein, the first set of multiple antenna elements and the second set of multiple antenna elements may be located at one or more antenna panels of the first wireless device.

In some examples of the method, apparatuses, and non-transitory computer-readable medium described herein, receiving the first downlink message in the first analog beamforming direction concurrently with the second downlink message in the second analog beamforming direction may include operations, features, means, or instructions for receiving the first downlink message via a first set of antenna panels and the second downlink message via a non-overlapping second set of antenna panels, where the first set of antenna panels correspond to the LOS mode and the non-overlapping second set of antenna panels correspond to the indirect LOS mode.

In some examples of the method, apparatuses, and non-transitory computer-readable medium described herein, each antenna panel of the first set of antenna panels and the non-overlapping second set of antenna panels may be connected to one subset of antennas that includes a sub-array, a partial connection architecture, or both, implemented by the first wireless device.

In some examples of the method, apparatuses, and non-transitory computer-readable medium described herein, receiving the first downlink message in the first analog beamforming direction concurrently with the second downlink message in the second analog beamforming direction may include operations, features, means, or instructions for receiving the first downlink message and the second downlink message concurrently via a same set of antenna panels, where the first downlink message corresponds to the LOS mode and the second downlink message corresponds to the indirect LOS mode.

In some examples of the method, apparatuses, and non-transitory computer-readable medium described herein, each antenna panel of the same set of antenna panels may be connected to multiple subsets of antennas or all antennas that includes a hybrid connection architecture or a full connection architecture implemented by the first wireless device.

A method for wireless communication at a first wireless device is described. The method may include transmitting, to a second wireless device, an indication of a capability of the first wireless device to concurrently transmit first signaling in a first analog beamforming direction using a first TCI state corresponding to a LOS mode and second signaling in a second analog beamforming direction using a second TCI state corresponding to an indirect LOS mode and transmitting, to the second wireless device, a first message in the first analog beamforming direction using the first TCI state concurrently with a second message in the second analog beamforming direction using the second TCI state.

An apparatus for wireless communication at a first wireless device is described. The apparatus may include a processor, memory coupled with the processor, and instructions stored in the memory. The instructions may be executable by the processor to cause the apparatus to transmit, to a second wireless device, an indication of a capability of the first wireless device to concurrently transmit first signaling in a first analog beamforming direction using a first TCI state corresponding to a LOS mode and second signaling in a second analog beamforming direction using a second TCI state corresponding to an indirect LOS mode and transmit, to the second wireless device, a first message in the first analog beamforming direction using the first TCI state concurrently with a second message in the second analog beamforming direction using the second TCI state.

Another apparatus for wireless communication at a first wireless device is described. The apparatus may include means for transmitting, to a second wireless device, an indication of a capability of the first wireless device to concurrently transmit first signaling in a first analog beamforming direction using a first TCI state corresponding to a LOS mode and second signaling in a second analog beamforming direction using a second TCI state corresponding to an indirect LOS mode and means for transmitting, to the second wireless device, a first message in the first analog beamforming direction using the first TCI state concurrently with a second message in the second analog beamforming direction using the second TCI state.

A non-transitory computer-readable medium storing code for wireless communication at a first wireless device is described. The code may include instructions executable by a processor to transmit, to a second wireless device, an indication of a capability of the first wireless device to concurrently transmit first signaling in a first analog beamforming direction using a first TCI state corresponding to a LOS mode and second signaling in a second analog beamforming direction using a second TCI state corresponding to an indirect LOS mode and transmit, to the second wireless device, a first message in the first analog beamforming direction using the first TCI state concurrently with a second message in the second analog beamforming direction using the second TCI state.

Some examples of the method, apparatuses, and non-transitory computer-readable medium described herein may further include operations, features, means, or instructions for receiving, from the second wireless device, a CSI feedback message including one or more parameters associated with the first analog beamforming direction, the second analog beamforming direction, or both, where a first quantity of antenna panels associated with the LOS mode and a second quantity of antenna panels associated with the indirect LOS mode may be based on the one or more parameters.

In some examples of the method, apparatuses, and non-transitory computer-readable medium described herein, the one or more parameters include a received signal strength measurement, a channel rank parameter corresponding to the first analog beamforming direction and the second analog beamforming direction, a link reliability parameter corresponding to the first analog beamforming direction and the second analog beamforming direction, or any combination thereof.

In some examples of the method, apparatuses, and non-transitory computer-readable medium described herein, the first message includes a first DMRS and the second message includes a second DMRS and the method, apparatuses, and non-transitory computer-readable medium may include further operations, features, means, or instructions for transmitting a TCI message including quasi-colocation information that indicates the first analog beamforming direction and the second analog beamforming direction and transmitting the first DMRS on a downlink data channel in the first analog beamforming direction, and the second DMRS on the downlink data channel in the second analog beamforming direction.

In some examples of the method, apparatuses, and non-transitory computer-readable medium described herein, transmitting the first DMRS and the second DMRS may include operations, features, means, or instructions for transmitting the first DMRS via a first DMRS port and the second DMRS via a second DMRS port based on the TCI message.

In some examples of the method, apparatuses, and non-transitory computer-readable medium described herein, the first DMRS port may be associated with a first set of DMRS ports corresponding to the first analog beamforming direction of the LOS mode and the second DMRS port may be associated with a second set of DMRS ports corresponding to the second analog beamforming direction of the indirect LOS mode.

Some examples of the method, apparatuses, and non-transitory computer-readable medium described herein may further include operations, features, means, or instructions for receiving, from the second wireless device, a first uplink message in the first analog beamforming direction and a second uplink message in the second analog beamforming direction based on the TCI message.

Some examples of the method, apparatuses, and non-transitory computer-readable medium described herein may further include operations, features, means, or instructions for transmitting, to the second wireless device, an indication of a first quantity of antenna panels available for communicating with the second wireless device in the first analog beamforming direction and a second quantity of antenna panels available for communicating with the second wireless device in the second analog beamforming direction.

In some examples of the method, apparatuses, and non-transitory computer-readable medium described herein, transmitting the first message in the first analog beamforming direction concurrently with the second message in the second analog beamforming direction may include operations, features, means, or instructions for transmitting the first message via a first set of multiple antenna elements corresponding to the LOS mode and the second message via a second set of multiple antenna elements corresponding to the indirect LOS mode.

In some examples of the method, apparatuses, and non-transitory computer-readable medium described herein, the first set of multiple antenna elements and the second set of multiple antenna elements may be located at one or more antenna panels of the first wireless device.

In some examples of the method, apparatuses, and non-transitory computer-readable medium described herein, transmitting the first message in the first analog beamforming direction concurrently with the second message in the second analog beamforming direction may include operations, features, means, or instructions for transmitting the first message via a first set of antenna panels and the second message via a non-overlapping second set of antenna panels, where the first set of antenna panels correspond to the LOS mode and the non-overlapping second set of antenna panels correspond to the indirect LOS mode.

In some examples of the method, apparatuses, and non-transitory computer-readable medium described herein, each antenna panel of the first set of antenna panels and the non-overlapping second set of antenna panels may be connected to one subset of antennas that includes a sub-array, a partial connection architecture, or both, implemented by the first wireless device.

In some examples of the method, apparatuses, and non-transitory computer-readable medium described herein, transmitting the first message in the first analog beamforming direction concurrently with the second message in the second analog beamforming direction may include operations, features, means, or instructions for transmitting the first message and the second message via a same set of antenna panels, where the first message corresponds to the LOS mode and the second message corresponds to the indirect LOS mode.

In some examples of the method, apparatuses, and non-transitory computer-readable medium described herein, each antenna panel of the same set of antenna panels may be connected to multiple subsets of antennas or all antennas that includes a hybrid connection architecture or a full connection architecture implemented by the first wireless device.

DETAILED DESCRIPTION

Figure 1:
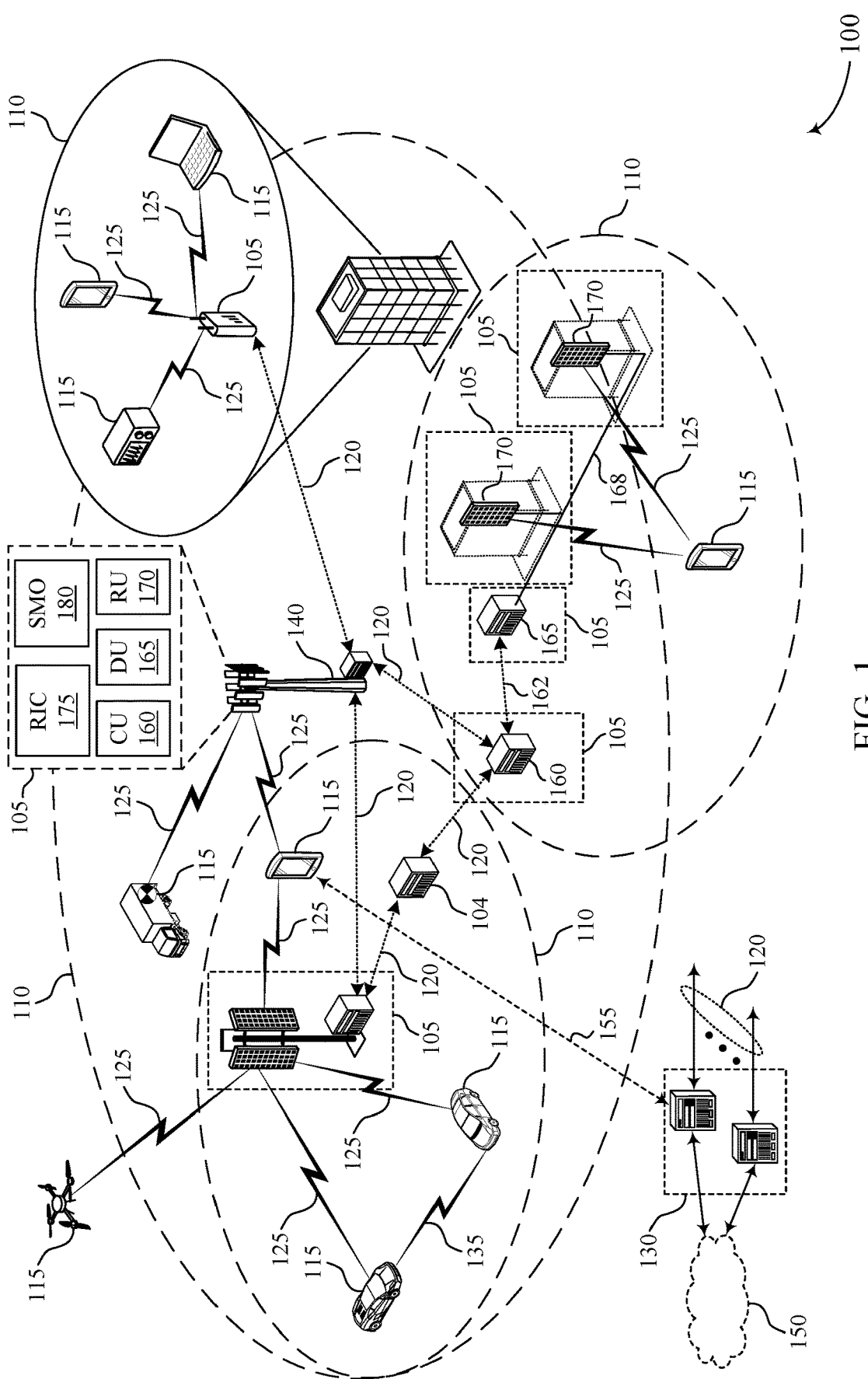
FIG. 1 illustrates an example of a wireless communications system that supports enhanced line-of-sight (LOS) communications with analog multi-path beamforming in accordance with one or more aspects of the present disclosure.

Some wireless communications systems may support signaling via high frequency bands (e.g., millimeter wave (mmW) and sub-terahertz (THz) bands) using analog beamforming to overcome the relatively high path loss associated with such high frequencies and to increase signal-to-noise (SNR) ratio. In some examples, wireless devices may implement line-of-sight (LOS) multiple input multiple output (MIMO) techniques alongside analog beamforming to achieve increased spatial degrees of freedom, and thus, increased overall signaling throughput, by using orthogonal spatial waveforms across transmit and receive antenna apertures. LOS MIMO techniques, however, implement highly directional antennas that may point in one direction only (e.g., the LOS direction), which may limit potential path gain (e.g., relative to if multiple directions were employed).

To increase the throughput and overall signaling performance of beamformed communications in relatively high frequency bands, wireless devices may support beamforming in one or more non-line-of-sight (NLOS) directions (e.g., indirect LOS paths) in addition to a LOS direction. For example, at least one antenna panel of a device allocated for beamforming for a LOS path may also form a beam that is directed in an NLOS path. In such examples, a device may support a multi-panel antenna array to perform multi-path analog beamforming (e.g., aperture waveform coding (AWC)) to harvest both LOS and NLOS paths gains in mmW and higher frequency bands. More specifically, multiple antenna elements may be bundled into several panels at both the receiving and transmitting devices, where one or more of the several antenna panels support either LOS beamforming or NLOS beamforming (e.g., one antenna panel supports simultaneous LOS and NLOS for a hybrid-connection or full connection architecture, or separate antenna panels point in separate LOS and NLOS directions for a subarray connection architecture).

Such enhanced LOS and NLOS implementations may also implement capability or assistance signaling between transmitting and receiving devices. For example, a transmitting device (such as a distributed unit (DU) or network entity) may signal to a receiving device (such as an radio unit (RU) or a user equipment (UE)) an applied analog beamforming direction (e.g., LOS or NLOS) via quasi-colocation (QCL) information associated with one or more demodulation reference signal (DMRS) ports for receiving downlink data or transmitting uplink data. Implementation of techniques described herein may increase signaling capacity and throughput for wireless systems by harvesting additional signaling paths and by simultaneously creating more than one spatial degree of freedom for communications.

Aspects of the disclosure are initially described in the context of wireless communications systems. Aspects of the disclosure are further illustrated by and described with reference to a wireless communications system, antenna panel architectures, and a process flow. Aspects of the disclosure are further illustrated by and described with reference to apparatus diagrams, system diagrams, and flowcharts that relate to enhancing LOS communications with analog multi-path beamforming.

FIG. 1 illustrates an example of a wireless communications system 100 that supports enhanced LOS communications with analog multi-path beamforming in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support enhanced LOS communications with analog multi-path beamforming as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some wireless devices such as UE 115 and network entities 105 may implement analog beamforming with LOS MIMO, which uses highly directional beamforming. In some cases, however, a device may experience signaling interference or beam failure in the LOS direction, resulting in reduced throughput. Techniques described herein may support the use of one or more NLOS paths in addition to the LOS path, which may result in the improved the performance of a LOS-MIMO system, for example, in such cases of increased interference. For example, at least one panel of a LOS-MIMO system implemented at a device may form one or more beams that are directed in one or more NLOS paths. In such examples, the device may support a multi-panel antenna array to perform multi-path analog beamforming to harvest both LOS and NLOS paths gains in mmW and higher frequency bands. More specifically, antenna elements may be bundled into several panels at both the receiving and transmitting devices, where one or more antenna panels support either LOS beamforming or NLOS beamforming (e.g., one antenna panel supports simultaneous LOS and NLOS for a hybrid-connection or full connection architecture, or separate antenna panels point in separate LOS and NLOS directions for a subarray connection architecture).

Figure 2:
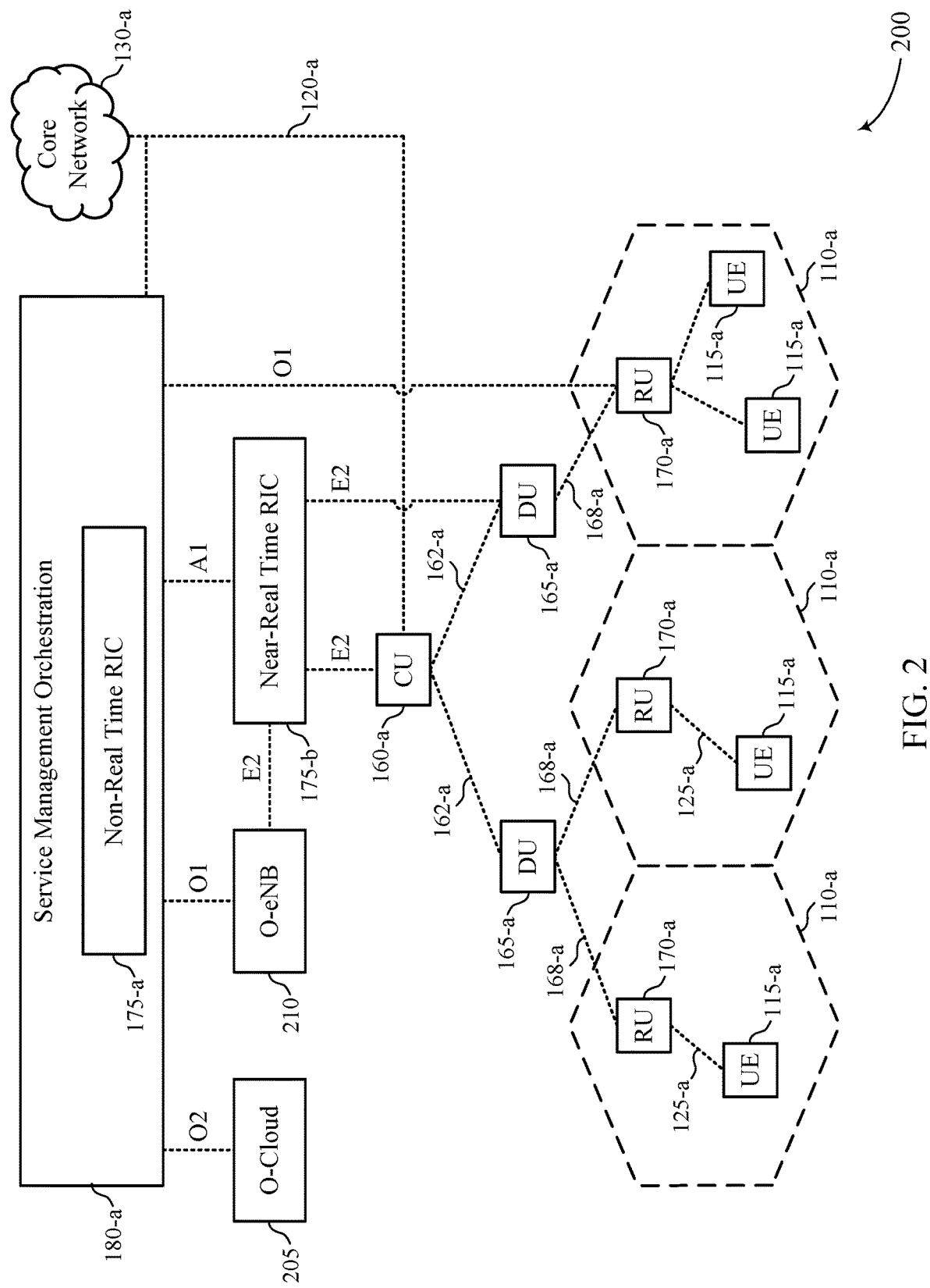
FIG. 2 illustrates an example of a network architecture that supports enhanced LOS communications with analog multi-path beamforming in accordance with one or more aspects of the present disclosure.

FIG. 2 illustrates an example of a network architecture 200 (e.g., a disaggregated base station architecture, a disaggregated RAN architecture) that supports enhanced LOS communications with analog multi-path beamforming in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
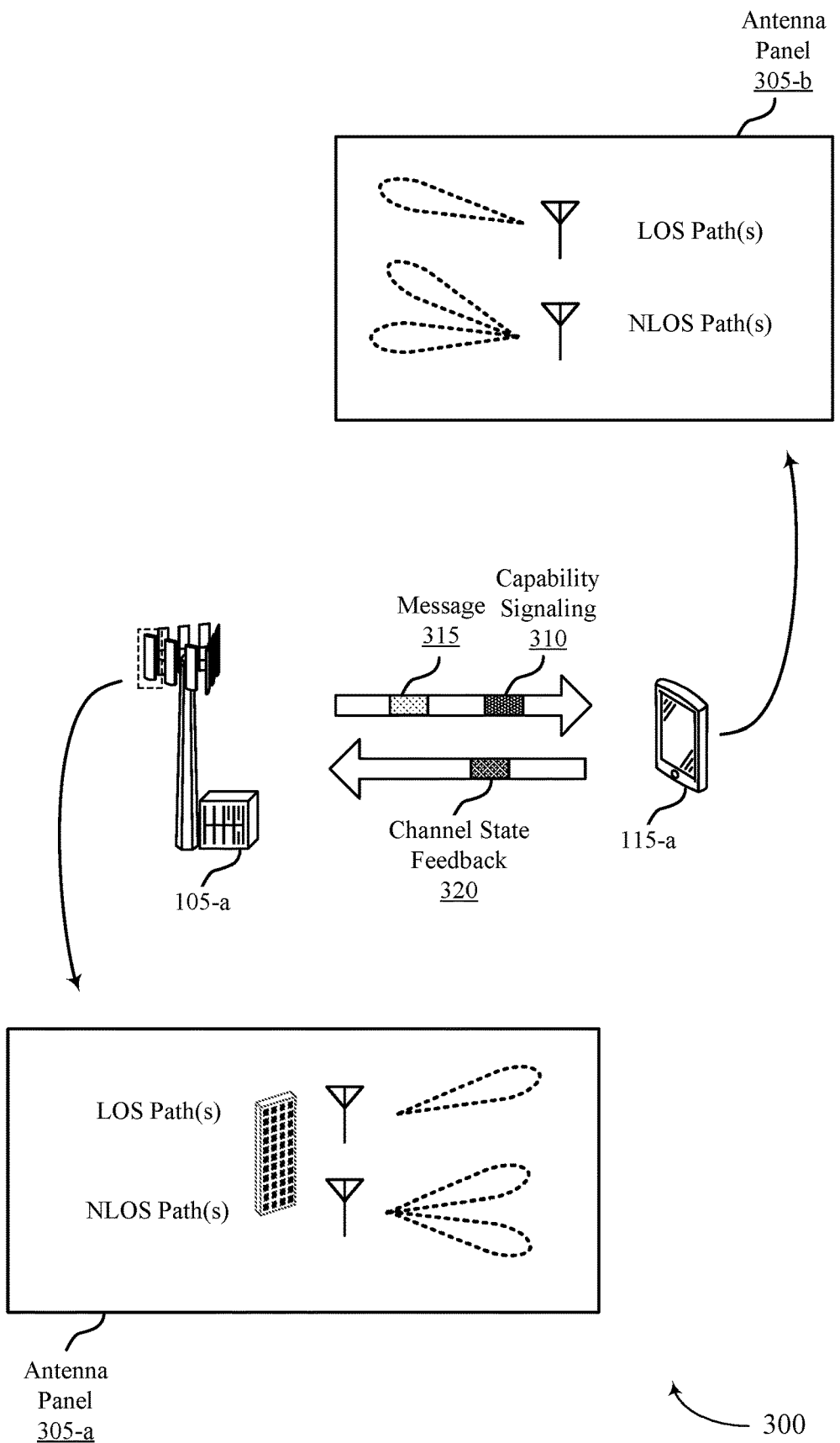
FIG. 3 illustrates an example of a wireless communications system that supports enhanced LOS communications with analog multi-path beamforming in accordance with one or more aspects of the present disclosure.

FIG. 3 illustrates an example of a wireless communications system 300 that supports enhanced LOS communications with analog multi-path beamforming in accordance with one or more aspects of the present disclosure. For example, the wireless communications system 300 may support communications between a UE 115-*a* and a network entity 105-*a*. The UE 115-*a* may be an example of the UE 115 as described with reference to FIG. 1, and may support RU capabilities as described with reference to FIG. 2. The network entity 105-*a* may be an example of the network entity 105 as described with reference to FIG. 1, and may support DU capabilities, RU capabilities, or both, as described with reference to FIG. 2. The network entity 105-*a* and the UE 115-*a* may further be examples of generic wireless devices as described herein.

The network entity 105-*a* may communicate with the UE 115-*a* using LOS MIMO techniques, NLOS MIMO techniques, or both, based on channel conditions, device capabilities, and so on. For example, the network entity 105-*a* may transmit a capability signaling 310, which may include indication of the capability of the network entity 105-*a* (e.g., a second wireless device) to concurrently transmit signaling in both LOS and NLOS analog beamforming directions. The network entity 105-*a* may transmit a message to the UE 115-*a* (e.g., a first wireless device) according to the capability, and the UE 115-*a* may determine that it is to receive signaling from respective LOS and NLOS directions. The network entity 105-*a* may transmit the message 315 using the antenna panel 305-*a*. Antenna panel 305-*a* may support signaling via one or more LOS paths and one or more NLOS paths simultaneously, for example, using analog beamforming. The UE 115-*a* may transmit channel state information (CSI) feedback 320 to inform the network entity 105-*a* of parameters (e.g., signaling strength, achievable rank, link reliability) of the LOS and NLOS directions to further enhance both the LOS and NLOS communications. Based on the capability signaling from the network entity 105-*a*, the UE 115-*a* may receive LOS and NLOS signaling in different directions from the network entity using the antenna panel 305-*b*.

In some high frequency communications systems (e.g., communications via a mmW band, sub THz band, or other high frequency deployments), devices may employ analog beamforming to overcome high path loss and to achieve relatively higher SNR. In some examples, such as for systems that support higher signaling capacities, LOS-MIMO may increase the available spatial degrees of freedom by employing orthogonal spatial waveforms across transmit and receive apertures. In some examples, such as for high frequency transmissions or for transmissions that travel over long distances, LOS-MIMO may be implemented with analog beamforming to further increase coverage and reliability. In such systems, the analog beam may be formed at the antenna aperture pointing in the LOS direction (e.g., one singular direction). Thus, LOS-MIMO may rely on an optimally spaced multi panel array to achieve high spatial degrees of freedom (e.g., channel rank) and increased channel capacity.

Techniques described herein allow for the application of LOS-MIMO simultaneously with NLOS signaling, for example, using simultaneous analog beamforming in both LOS and NLOS directions. Such implementation may improve the performance of the LOS-MIMO system. At least one antenna panel at the network entity 105-a, such as the antenna panel 305-a, may form a beam corresponding to a LOS path and an NLOS path. In such examples, the network entity 105-a may implement analog beamforming, such as AWC, with multi-path analog beamforming (e.g., when the network entity supports LOS-MIMO via a multi-panel antenna array in mm Wave and higher frequency bands). The network entity 105-a may combine AWC techniques with multi-path analog beamforming and digital beamforming, where different sections of the array aperture are waveform coded with analog beams pointing to different directions (LOS and NLOS paths), as illustrated by antenna panel 305-a. In some examples, to support such simultaneous LOS and NLOS signaling, the network entity 105-a may support more than one spatial beamforming direction, and may allocate more than four DMRS ports per spatial beamforming direction.

Analog beamforming of LOS-MIMO systems may result in increased LOS and NLOS path gains. For example, as the distance between the UE 115-a and the network entity 105-a increases, channel capacity may decrease and there may be an increased risk of blockage and deep shadowing that may reduce the effectiveness of LOS techniques. When the UE 115-a and the network entity 105-a experience such reduction in channel capacity and relative degradation of LOS communications, the network entity 105-a may use both LOS and NLOS techniques to provide additional communication layers and to increase overall signaling quality and reliability. For example, wireless capacity may be increased by harvesting NLOS path beyond the LOS direction.

In some implementations, the network entity 105-a may create spatial degrees of freedom via the LOS and NLOS paths. For example, LOS-MIMO may create spatial degrees of freedom through curvature of the wavefront within the receiver or transmitter aperture, and operating MIMO at low frequency creates spatial degrees of freedom through multiple paths. In application of wireless fronthaul at large distances, for example, when the network entity 105-a employs aperture waveform encoding with analog multi-path beamforming, the network entity 105-a may share antennas between radio frequency (RF) chains (with a hybrid connection structure or full connection structure as described herein).

The antenna panel 305-a may be configured using various array architectures to utilize signaling using the NLOS path in addition to the LOS path, where analog beamforming occurs simultaneously in a LOS and a NLOS directions. For example, possible array architectures may include a separate subarray architecture, a hybrid connected subarray architecture, or a fully connected subarray architecture, and may be described further with reference to FIG. 4A, FIG. 4B, and FIG. 4C. The capability signaling 310 may indicate to the UE 115-a that the network entity 105-a has the capability to transmit in two directions (specified by two transmission configuration index (TCI) states), and how many layers are related to each direction (e.g., how many DMRS ports are associated with each direction). The UE 115-a (e.g., the RU) may use the capability signaling 310 from the network entity 105-a (e.g., the DU) to prepare antenna panels (e.g., antenna panel 305-b) for each direction to receive the message 315 in both LOS and NLOS directions. In some examples, the network entity 105-a may use rank 5 in LOS and rank 2 in NLOS. Correspondingly, the UE 115-a may also dedicate at least 5 of its subarrays pointing to LOS and at least 2 subarrays into NLOS direction.

In some examples, antenna elements may be bundled into several panels at the network entity 105-a and the UE 115-a. The analog beamforming towards the LOS or NLOS directions may be achieved by panels of antenna elements (e.g., antenna panel 305-a and antenna panel 305-b). In some examples of connection architectures, such as a subarray connection architecture, one antenna panel may point to either in a LOS or a NLOS direction. In some other examples, one antenna panel, such as the antenna panel 305-a, may simultaneously point to a LOS and a NLOS direction (hybrid-connection or full connection architecture). In some implementations, different antenna geometries at the network entity 105-a and the UE 115-a may be used to accommodate both LOS and NLOS beamforming directions.

In some examples, the number for panels dedicated to a LOS or NLOS direction may depend on a number of parameters that the network entity 105-a receives via CSI feedback 320 from the UE 115-a. For example, these parameters may include the received signal strength, achievable rank, and the link reliability.

The techniques described herein may support a downlink system, an uplink, system, or both. For example, in a downlink system, the network entity 105-a (e.g., the transmitter, DU, or giga-nodeB (gNB)) may signal to the UE 115-a (e.g., the receiver, RU) the applied analog beamforming direction (LOS and NLOS) through QCL information associated with each DMRS port for signaling via a physical downlink shared channel (PDSCH). The UE 115-a may signal to the network entity 105-a how many panels are available for transmission and reception. Such a design may be applicable to wireless fronthaul applications, where one network entity may be the transmitter and another network entity may be the receiver. In an uplink system, the network entity 105-a (e.g., the receiver) may signal to the UE 115-a (e.g., transmitter) the applied analog beamforming direction for reception of each DMRS port for communications via a physical uplink shared channel (PUSCH). The network entity 105-a may signal to the UE 115-a, the number of panels to be used on each direction (LOS and NLOS) for sounding reference signaling (SRS) and PUSCH.

The techniques described herein for the hybrid connection structure allows for increased spectral efficiencies by compensating the decreased rank of LOS path at large distances by adding the degrees of freedom of the NLOS path. For example, AWC performance for hybrid connection may vary according to spectrum efficiency, and the addition of NLOS paths to the LOS path may increase the number of available signaling paths to increase system reliability and throughput.

Figure 4A:
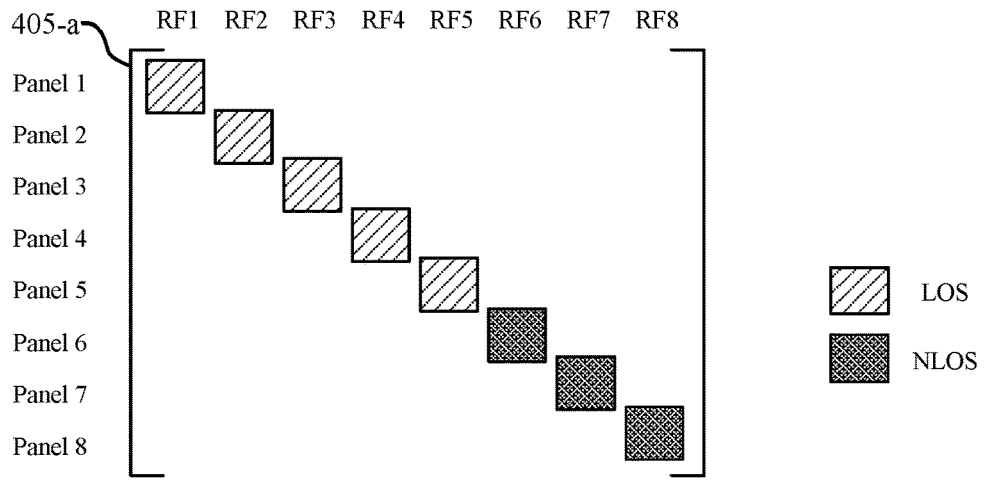
FIGS. 4A, 4B, and 4C illustrate examples of antenna panel architectures that supports enhanced LOS communications with analog multi-path beamforming in accordance with one or more aspects of the present disclosure.

FIG. 4A illustrates an example of an antenna panel architecture 401 that supports enhanced LOS communications with analog multi-path beamforming in accordance with one or more aspects of the present disclosure. The antenna panel architecture 401 illustrates an example of a design for subarray connection architecture. The matrix 405-a may include LOS and NLOS beams corresponding to panels and RFs. The rows may indicate the panel, and the columns may indicate the RF. In matrix 405-a, RF1 and panel 1 correspond to a LOS analog beam, RF6 and panel 6 correspond to NLOS beams, etc.

In matrix 405-a, each antenna panel (consisting of N antenna elements) may be driven by or otherwise associated with one single RF chain. Each panel may be assigned different beams (e.g., beams in the LOS or NLOS direction). Each panel may form an analog beam either pointing to a LOS direction (e.g., beam weight $V_1$) or a NLOS direction (e.g., beam weight $V_2$).

Figure 4B:
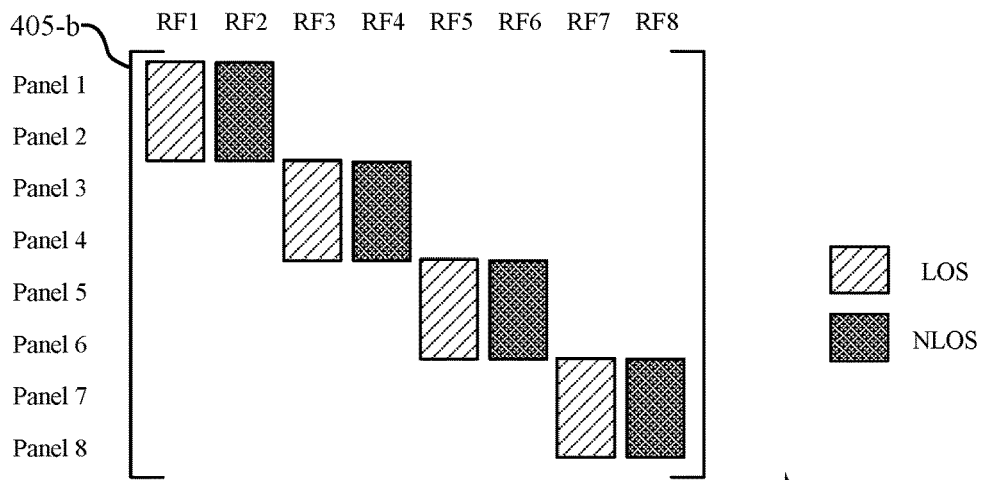

FIG. 4B illustrates an example of an antenna panel architecture 402 that supports enhanced LOS communications with analog multi-path beamforming in accordance with one or more aspects of the present disclosure. The antenna panel architecture 402 illustrates an example of a design for hybrid-connection architecture. The matrix 405-*b* may include LOS and NLOS beams corresponding to panels and corresponding RF chains. The rows may indicate the panel, and the columns may indicate the RF chain. In matrix 405-*b*, RF1, panel 1, and panel 2 may correspond to a LOS analog beam, while RF2, panel 1, and panel 2 may correspond to a NLOS beam, and so on.

Each antenna panel may be driven by or otherwise associated with two or more RF chains, (e.g., less than all RF chains). For example, panel 1 and panel 2 may be driven by RF1 and RF2, and each panel may form analog beams simultaneously pointing to a LOS (e.g., beam weight $V_1$) and a NLOS direction (e.g., beam weight $V_2$). In some examples, the transmit power allocation between the LOS direction and the NLOS direction may be dynamically adjusted. For example, the design may include analog beam weights $V_1$ pointing to LOS direction, and analog beam weights $V_2$ pointing to NLOS direction. The relative power assigned to $V_1$ and $V_2$ may be optimized or adjusted to meet a total power threshold, and may be assigned to use any unused power from the LOS path (e.g., after the LOS path reaches constellation saturation or another power threshold). In such examples, the relative power assignment may be dynamically adjusted. In some other examples, odd RFs may use beam weight $V_1$ corresponding to the LOS direction and even RFs may use beam weight $V_2$ corresponding to the NLOS direction. In some examples, such hybrid connection may significantly improve system performance, for example, relative to system performance associated with subarray connections.

Figure 4C:
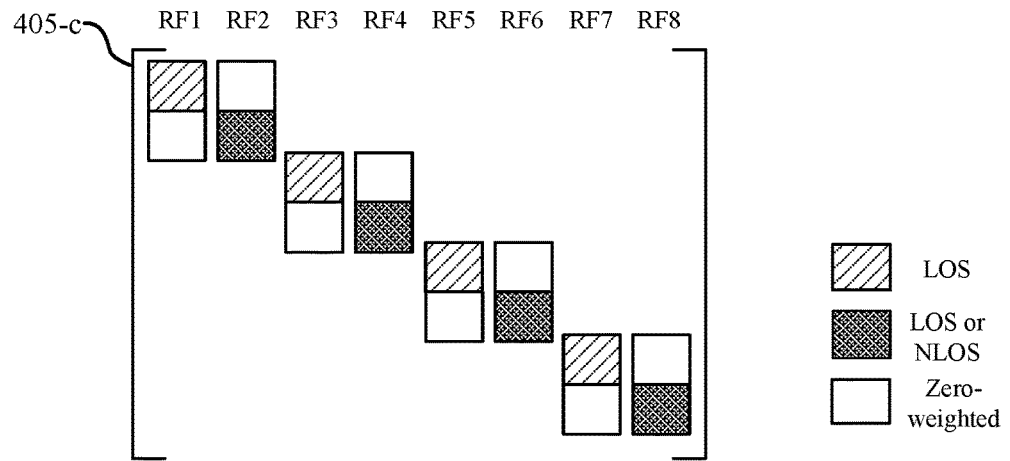

FIG. 4C illustrates an example of an antenna panel architecture 403 that supports enhanced LOS communications with analog multi-path beamforming in accordance with one or more aspects of the present disclosure. The antenna panel architecture 403 illustrates an example of a design for hybrid subarray connection architecture. The matrix 405-*c* may include LOS and NLOS beams, as well as zero-weighted entries, corresponding to RF chains. The columns may indicate RF chains, and the rows may be defined by analog size (e.g., W_Analog-1024×8). In matrix 405-*c*, RF1 may include a LOS beam constructed from one half of the panel elements and zero weighting for the other half of the panel elements. RF2 may include zero weighting for one half of the panel elements and a LOS or NLOS beam constructed from the other half of the panel elements, and so on. In some examples, such hybrid connection may increase subarray connection performance.

In some examples, carrier phase offset (CPO) may be associated with the LOS direction. Zeroes may be assigned to create a null, and zeroes may be assigned to the second half of an odd RF chain beamforming vector and CPO beamforming is assigned to the first half. Zeroes may be assigned to the first half of an even RF chain beamforming vector and CPO beamforming may be assigned to the second half. For example, RF1 may have a first half of a CPO beam for LOS and a second half of zeroes, and RF2 may have a first half of zeroes and a second half of a CPO beam for LOS or NLOS. In some examples, the beam may switch to CPO, such as if the LOS channel is strong (e.g., short distances).

In some examples, the hybrid architecture may include using SSB beam sweeping or CSI-RS beam refinement processing, which may find the first strongest beam (e.g., b1) and the second strongest beam (e.g., b2). Based on the beam power ratio (e.g., Pwr_b1/Pwr_b2) and a threshold, analog beamforming weights may be assigned to different RF chains pointing in the direction of the first strongest beam or the second strongest beam (e.g., to exploit both LOS and NLOS channel paths). In some examples, a throughput performance metric may be used to find appropriate beams for sub-array connected panels for a LOS-MIMO structure when non-LOS paths are also available (e.g., in addition to LOS paths), which may result in increased system throughput relative to the single LOS path. In some examples, the throughput performance metric may be used to find beams for the hybrid connected panels under the presence of non-LOS paths, which may further increase system throughput.

Figure 5:
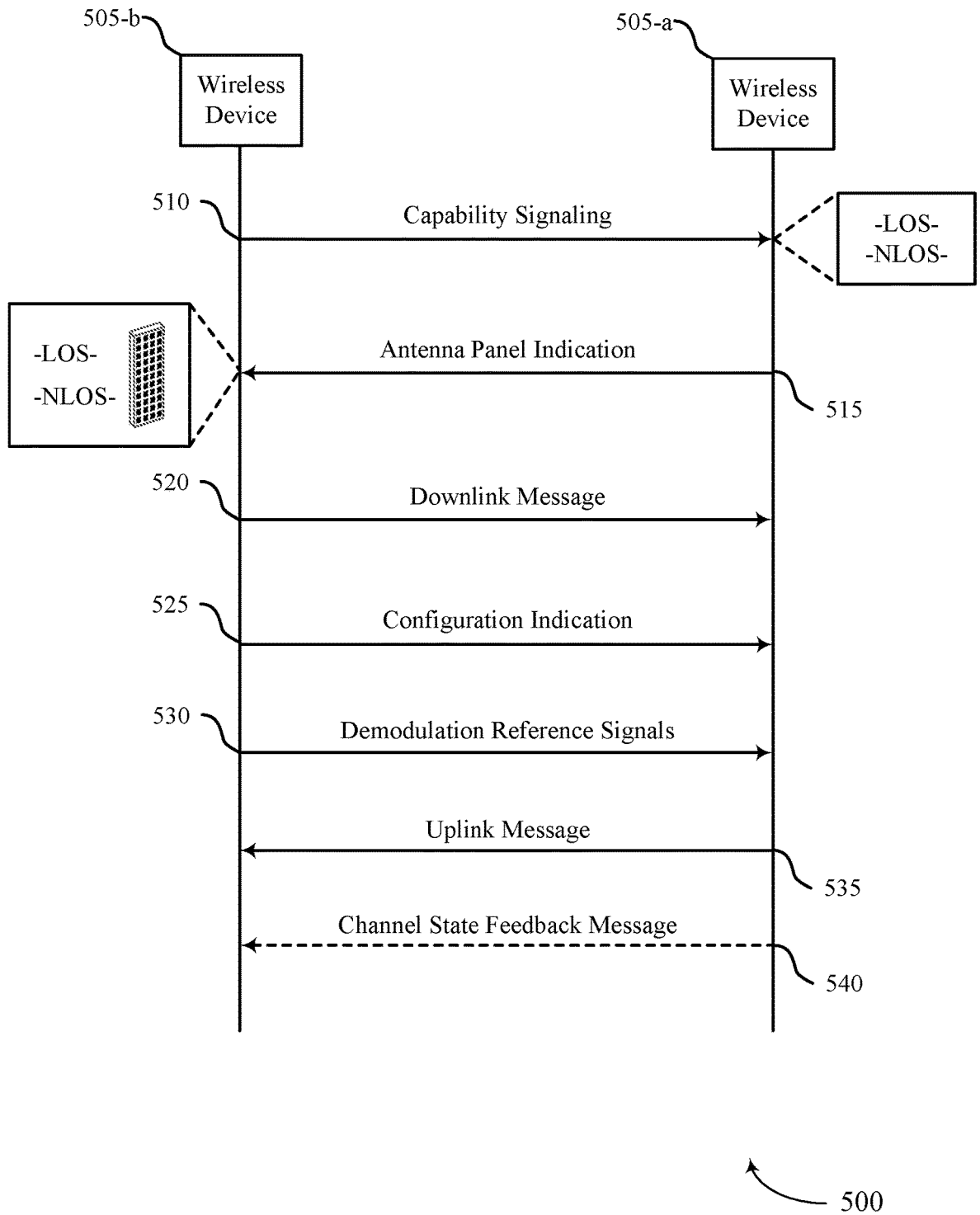
FIG. 5 illustrates an example of a process flow that supports enhanced LOS communications with analog multi-path beamforming in accordance with one or more aspects of the present disclosure.

FIG. 5 illustrates an example of a process flow 500 that supports enhanced LOS communications with analog multi-path beamforming in accordance with one or more aspects of the present disclosure. The process flow 500 illustrates the communications between a first wireless device 505-*a* and a second wireless device 505-*b*. The first wireless device 505-*a* and the second wireless device 505-*b* may be examples of the network entity 105, the UE 115, or another wireless device as described herein. In the following description of process flow 500, the operations between the wireless devices may be transmitted in a different order than the order shown, or other operations may be added or removed from the process flow 500. For example, some operations may also be left out of process flow 500, may be performed in different orders or at different times, or other operations may be added to process flow 500. Although the first wireless device 505-*a* and the second wireless device 505-*b* are shown performing the operations of process flow 500, some aspects of some operations may also be performed by one or more other wireless or network devices.

At 510, the first wireless device 505-*a* may receive, from the second wireless device 505-*b*, an indication of a capability of the second wireless device 505-*b* to concurrently transmit first signaling in a first analog beamforming direction using a first TCI state corresponding to a LOS mode, and second signaling in a second analog beamforming direction using a second TCI state corresponding to an indirect LOS mode (e.g., NLOS mode).

At 515, the first wireless device 505-*a* may transmit, to the second wireless device 505-*b*, an indication of a first quantity of antenna panels available for communicating with the second wireless device 505-*b* in the first analog beamforming direction and a second quantity of antenna panels available for communicating with the second wireless device in the second analog beamforming direction.

At 520, the first wireless device 505-*a* may receive, from the second wireless device 505-*b*, a first downlink message in the first analog beamforming direction using the first TCI state concurrently with a second downlink message in the second analog beamforming direction using the second TCI state. In some examples, the first wireless device 505-*a* may receive the first downlink message via a first multiple of antenna elements corresponding to the LOS mode and the second downlink message via a second multiple of antenna elements corresponding to the indirect LOS mode (e.g., NLOS). In some examples, the first multiple of antenna elements and the second multiple of antenna elements may be located at one or more antenna panels of the first wireless device 505-*a*.

In some examples, the first wireless device 505-*a* may receive the first downlink message via a first set of antenna panels and the second downlink message via a non-overlapping second set of antenna panels, where the first set of antenna panels correspond to the LOS mode and the non-overlapping second set of antenna panels correspond to the indirect LOS mode (e.g., NLOS). In some examples, each antenna panel of the first set of antenna panels and the non-overlapping second set of antenna panels may be connected to one subset of antennas that comprises a sub-array, a partial connection architecture, or both, implemented by the first wireless device 505-a.

In some examples, the first wireless device 505-a may receive the first downlink message and the second downlink message concurrently via a same set of antenna panels, where the first downlink message corresponds to the LOS mode and the second downlink message corresponds to the indirect LOS mode (e.g., NLOS). In some examples, each antenna panel of the same set of antenna panels may be connected to multiple subsets of antennas or all antennas that includes a hybrid connection architecture or a full connection architecture implemented by the first wireless device 505-a.

At 525, the first wireless device 505-a may receive a configuration indication message. For example, the first wireless device 505-a may receive a TCI message including QCL information that indicates the first analog beamforming direction and the second analog beamforming direction.

At 530, the first wireless device 505-a may receive, based on the TCI message, the first DMRS on a downlink data channel in the first analog beamforming direction, and the second DMRS on the downlink data channel in the second analog beamforming direction. The first DMRS may be received via a first DMRS port and the second DMRS via a second DMRS port based on the TCI message.

In some examples, the first DMRS port may be associated with a first set of DMRS ports corresponding to the first analog beamforming direction of the LOS mode and the second DMRS port may be associated with a second set of DMRS ports corresponding to the second analog beamforming direction of the indirect LOS mode (e.g., NLOS).

At 535, the first wireless device 505-a may transmit, to the second wireless device, a first uplink message in the first analog beamforming direction and a second uplink message in the second analog beamforming direction based on the TCI message.

At 540, the first wireless device 505-a may transmit, to the second wireless device 505-b, a CSI feedback message including one or more parameters associated with the first analog beamforming direction, the second analog beamforming direction, or both, where a first quantity of antenna panels associated with the LOS mode and a second quantity of antenna panels associated with the indirect LOS mode (e.g., NLOS) are based on the one or more parameters. In some examples, the one or more parameters include a received signal strength measurement, a channel rank parameter corresponding to the first analog beamforming direction and the second analog beamforming direction, a link reliability parameter corresponding to the first analog beamforming direction and the second analog beamforming direction, or any combination thereof.

Figure 6:
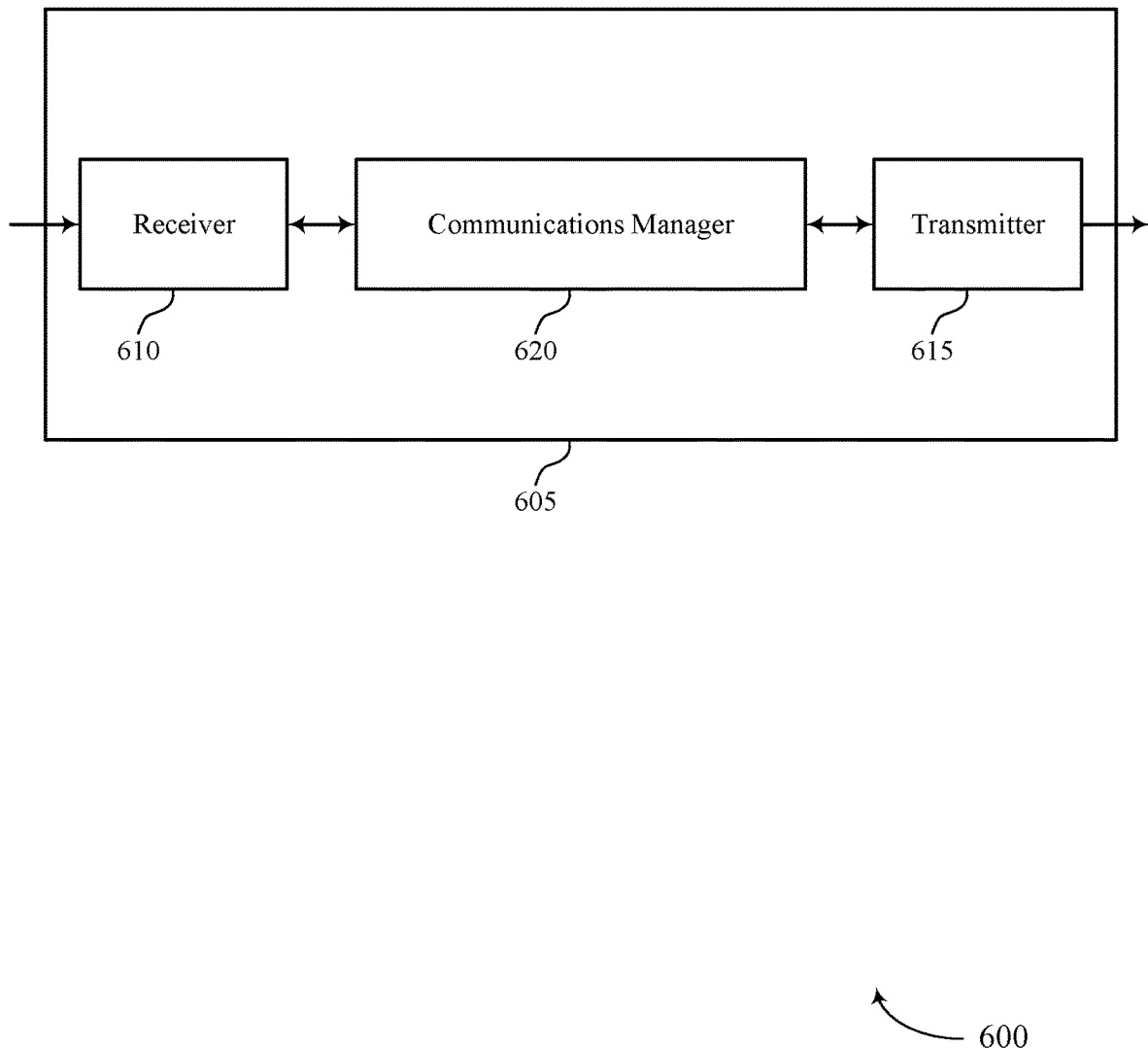
FIGS. 6 and 7 illustrate block diagrams of devices that support enhanced LOS communications with analog multi-path beamforming in accordance with one or more aspects of the present disclosure.

FIG. 6 illustrates a block diagram 600 of a device 605 that supports enhanced LOS communications with analog multi-path beamforming in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to enhanced LOS communications with analog multi-path beamforming). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhanced LOS communications with analog multi-path beamforming). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of enhanced LOS communications with analog multi-path beamforming as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first wireless device in accordance with examples as disclosed herein. For example, the communications manager 620 may be configured as or otherwise support a means for receiving, from a second wireless device, an indication of a capability of the second wireless device to concurrently transmit first signaling in a first analog beamforming direction using a first TCI state corresponding to a LOS mode, and second signaling in a second analog beamforming direction using a second TCI state corresponding to an indirect LOS mode. The communications manager 620 may be configured as or otherwise support a means for receiving, from the second wireless device, a first downlink message in the first analog beamforming direction using the first TCI state concurrently with a second downlink message in the second analog beamforming direction using the second TCI state.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for enhancing LOS communications with analog multi-path beamforming, which may result in reduced processing, reduced power consumption, more efficient utilization of communication resources, or a combination thereof.

Figure 7:
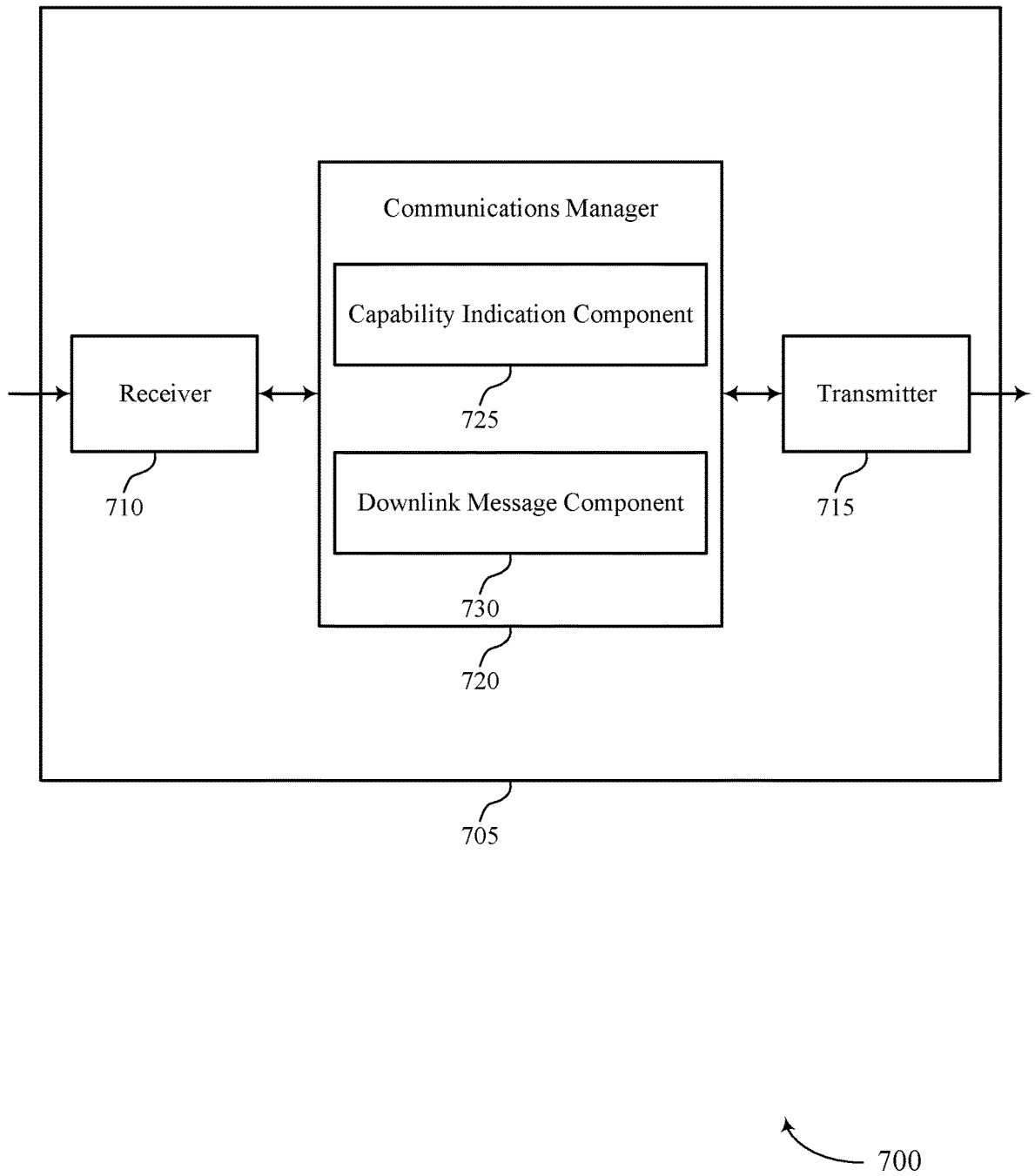

FIG. 7 illustrates a block diagram 700 of a device 705 that supports enhanced LOS communications with analog multi-path beamforming in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to enhanced LOS communications with analog multi-path beamforming). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to enhanced LOS communications with analog multi-path beamforming). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of enhanced LOS communications with analog multi-path beamforming as described herein. For example, the communications manager 720 may include a capability indication component 725 a downlink message component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first wireless device in accordance with examples as disclosed herein. The capability indication component 725 may be configured as or otherwise support a means for receiving, from a second wireless device, an indication of a capability of the second wireless device to concurrently transmit first signaling in a first analog beamforming direction using a first TCI state corresponding to a LOS mode, and second signaling in a second analog beamforming direction using a second TCI state corresponding to an indirect LOS mode. The downlink message component 730 may be configured as or otherwise support a means for receiving, from the second wireless device, a first downlink message in the first analog beamforming direction using the first TCI state concurrently with a second downlink message in the second analog beamforming direction using the second TCI state.

Figure 8:
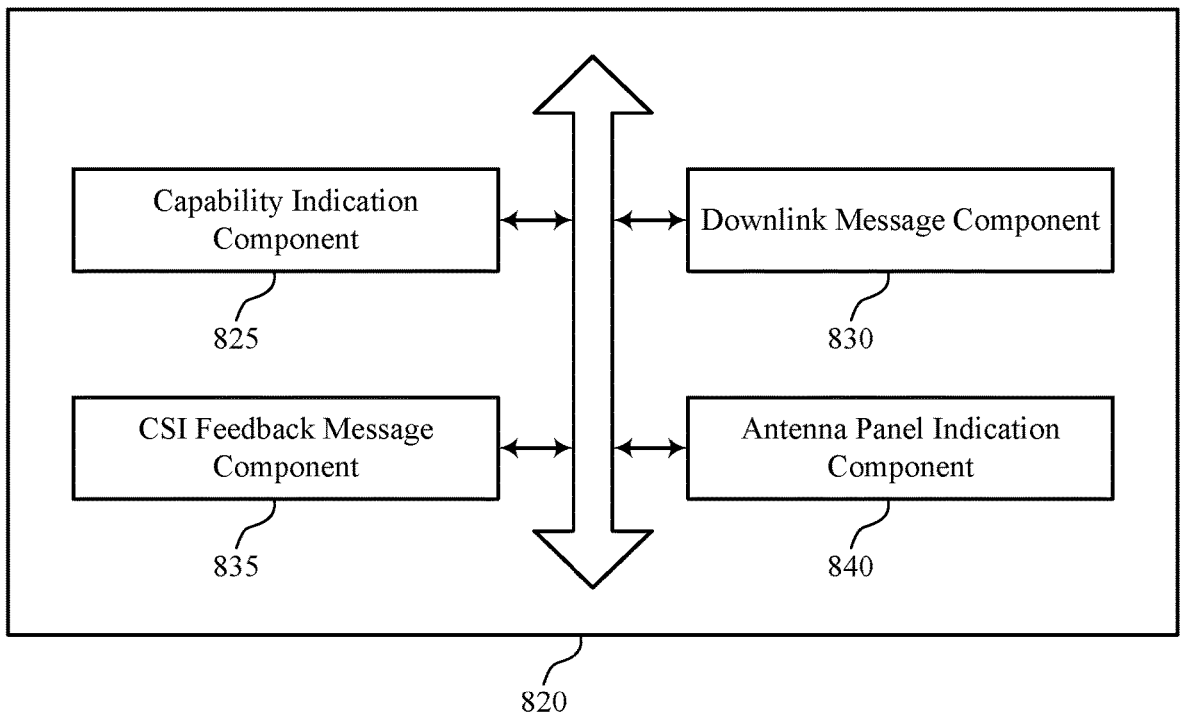
FIG. 8 illustrates a block diagram of a communications manager that supports enhanced LOS communications with analog multi-path beamforming in accordance with one or more aspects of the present disclosure.

FIG. 8 illustrates a block diagram 800 of a communications manager 820 that supports enhanced LOS communications with analog multi-path beamforming in accordance with one or more aspects of the present disclosure. The communications manager 820 may be an example of aspects of a communications manager 620, a communications manager 720, or both, as described herein. The communications manager 820, or various components thereof, may be an example of means for performing various aspects of enhanced LOS communications with analog multi-path beamforming as described herein. For example, the communications manager 820 may include a capability indication component 825, a downlink message component 830, a CSI feedback message component 835, an antenna panel indication component 840, or any combination thereof. Each of these components may communicate, directly or indirectly, with one another (e.g., via one or more buses).

The communications manager 820 may support wireless communication at a first wireless device in accordance with examples as disclosed herein. The capability indication component 825 may be configured as or otherwise support a means for receiving, from a second wireless device, an indication of a capability of the second wireless device to concurrently transmit first signaling in a first analog beamforming direction using a first TCI state corresponding to a LOS mode, and second signaling in a second analog beamforming direction using a second TCI state corresponding to an indirect LOS mode. The downlink message component 830 may be configured as or otherwise support a means for receiving, from the second wireless device, a first downlink message in the first analog beamforming direction using the first TCI state concurrently with a second downlink message in the second analog beamforming direction using the second TCI state.

In some examples, the CSI feedback message component 835 may be configured as or otherwise support a means for transmitting, to the second wireless device, a CSI feedback message including one or more parameters associated with the first analog beamforming direction, the second analog beamforming direction, or both, where a first quantity of antenna panels associated with the LOS mode and a second quantity of antenna panels associated with the indirect LOS mode are based on the one or more parameters.

In some examples, the one or more parameters include a received signal strength measurement, a channel rank parameter corresponding to the first analog beamforming direction and the second analog beamforming direction, a link reliability parameter corresponding to the first analog beamforming direction and the second analog beamforming direction, or any combination thereof.

In some examples, the first downlink message includes a first DMRS and the second downlink message includes a second DMRS, and the downlink message component 830 may be configured as or otherwise support a means for receiving a TCI message including QCL information that indicates the first analog beamforming direction and the second analog beamforming direction. In some examples, the first downlink message includes a first DMRS and the second downlink message includes a second DMRS, and the downlink message component 830 may be configured as or otherwise support a means for receiving, based on the TCI message, the first DMRS on a downlink data channel in the first analog beamforming direction, and the second DMRS on the downlink data channel in the second analog beamforming direction.

In some examples, to support receiving the first DMRS and the second DMRS, the downlink message component 830 may be configured as or otherwise support a means for receiving the first DMRS via a first DMRS port and the second DMRS via a second DMRS port based on the TCI message.

In some examples, the first DMRS port is associated with a first set of DMRS ports corresponding to the first analog beamforming direction of the LOS mode and the second DMRS port is associated with a second set of DMRS ports corresponding to the second analog beamforming direction of the indirect LOS mode.

In some examples, the downlink message component 830 may be configured as or otherwise support a means for transmitting, to the second wireless device, a first uplink message in the first analog beamforming direction and a second uplink message in the second analog beamforming direction based on the TCI message.

In some examples, the antenna panel indication component 840 may be configured as or otherwise support a means for transmitting, to the second wireless device, an indication of a first quantity of antenna panels available for communicating with the second wireless device in the first analog beamforming direction and a second quantity of antenna panels available for communicating with the second wireless device in the second analog beamforming direction.

In some examples, to support receiving the first downlink message in the first analog beamforming direction concurrently with the second downlink message in the second analog beamforming direction, the downlink message component 830 may be configured as or otherwise support a means for receiving the first downlink message via a first set of multiple antenna elements corresponding to the LOS mode and the second downlink message via a second set of multiple antenna elements corresponding to the indirect LOS mode.

In some examples, the first set of multiple antenna elements and the second set of multiple antenna elements are located at one or more antenna panels of the first wireless device.

In some examples, to support receiving the first downlink message in the first analog beamforming direction concurrently with the second downlink message in the second analog beamforming direction, the downlink message component 830 may be configured as or otherwise support a means for receiving the first downlink message via a first set of antenna panels and the second downlink message via a non-overlapping second set of antenna panels, where the first set of antenna panels correspond to the LOS mode and the non-overlapping second set of antenna panels correspond to the indirect LOS mode.

In some examples, each antenna panel of the first set of antenna panels and the non-overlapping second set of antenna panels is connected to one subset of antennas that includes a sub-array, a partial connection architecture, or both, implemented by the first wireless device.

In some examples, to support receiving the first downlink message in the first analog beamforming direction concurrently with the second downlink message in the second analog beamforming direction, the downlink message component 830 may be configured as or otherwise support a means for receiving the first downlink message and the second downlink message concurrently via a same set of antenna panels, where the first downlink message corresponds to the LOS mode and the second downlink message corresponds to the indirect LOS mode.

In some examples, each antenna panel of the same set of antenna panels is connected to multiple subsets of antennas or all antennas that includes a hybrid connection architecture or a full connection architecture implemented by the first wireless device.

Figure 9:
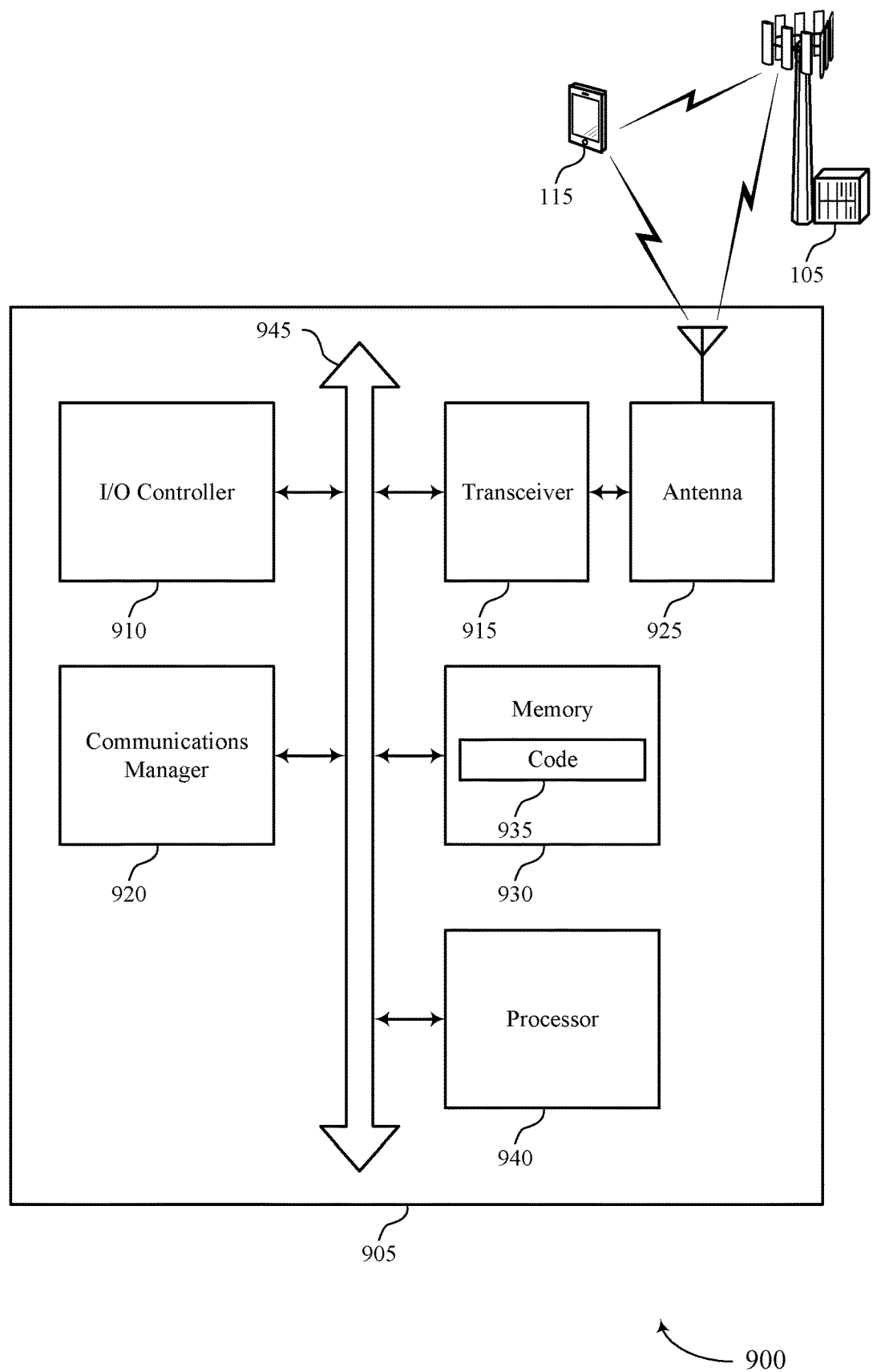
FIG. 9 illustrates a diagram of a system including a device that supports enhanced LOS communications with analog multi-path beamforming in accordance with one or more aspects of the present disclosure.

FIG. 9 illustrates a diagram of a system 900 including a device 905 that supports enhanced LOS communications with analog multi-path beamforming in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting enhanced LOS communications with analog multi-path beamforming). For example, the device 905 or a component of the device 905 may include a processor 940 and memory 930 coupled with or to the processor 940, the processor 940 and memory 930 configured to perform various functions described herein.

The communications manager 920 may support wireless communication at a first wireless device in accordance with examples as disclosed herein. For example, the communications manager 920 may be configured as or otherwise support a means for receiving, from a second wireless device, an indication of a capability of the second wireless device to concurrently transmit first signaling in a first analog beamforming direction using a first TCI state corresponding to a LOS mode, and second signaling in a second analog beamforming direction using a second TCI state corresponding to an indirect LOS mode. The communications manager 920 may be configured as or otherwise support a means for receiving, from the second wireless device, a first downlink message in the first analog beamforming direction using the first TCI state concurrently with a second downlink message in the second analog beamforming direction using the second TCI state.

By including or configuring the communications manager 920 in accordance with examples as described herein, the device 905 may support techniques for enhancing LOS communications with analog multi-path beamforming, which may result in improved communication reliability, reduced latency, improved user experience related to reduced processing, reduced power consumption, more efficient utilization of communication resources, improved coordination between devices, longer battery life, improved utilization of processing, or a combination thereof.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of enhanced LOS communications with analog multi-path beamforming as described herein, or the processor 940 and the memory 930 may be otherwise configured to perform or support such operations.

Figure 10:
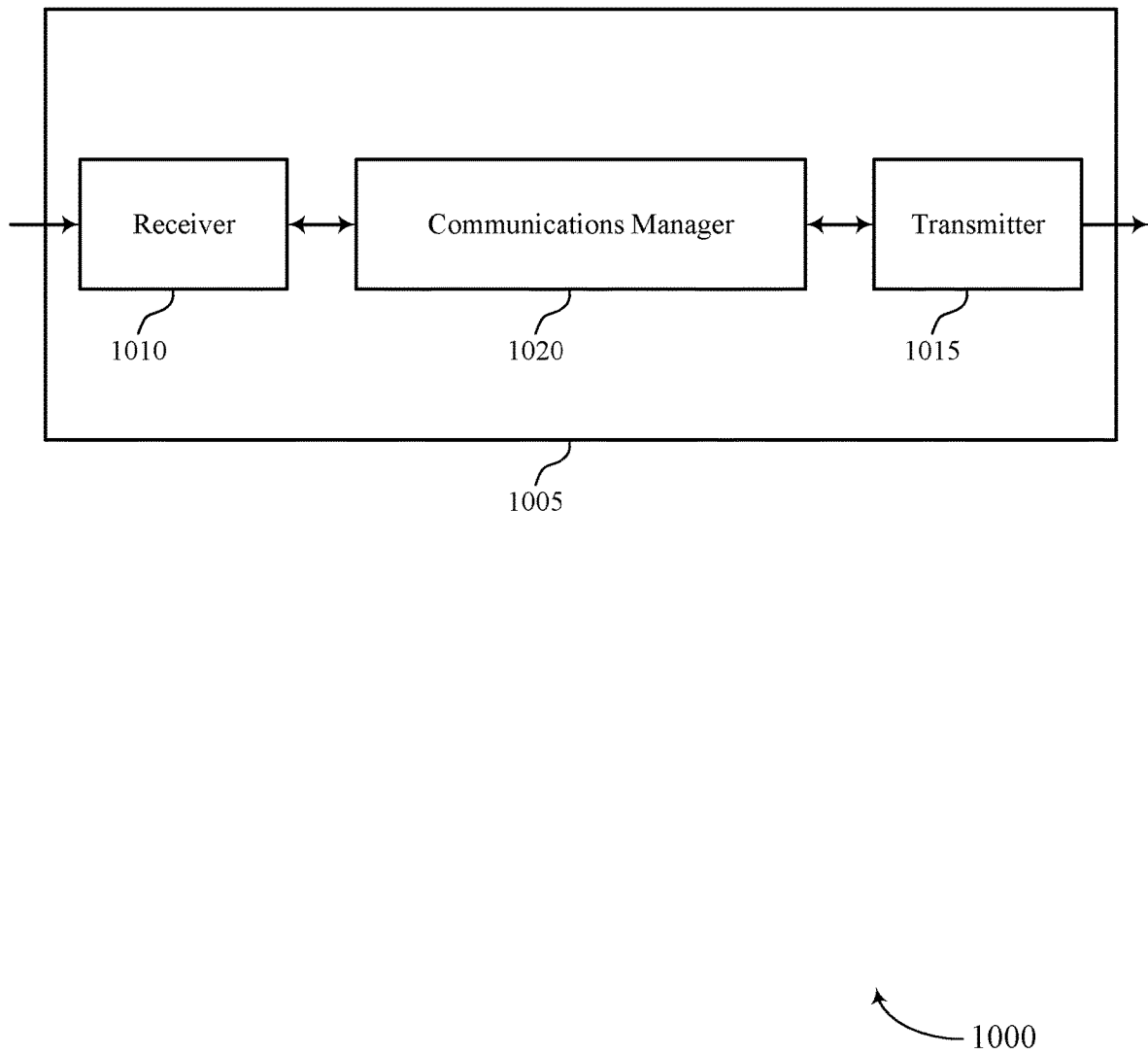
FIGS. 10 and 11 illustrate block diagrams of devices that support enhanced LOS communications with analog multi-path beamforming in accordance with one or more aspects of the present disclosure.

FIG. 10 illustrates a block diagram 1000 of a device 1005 that supports enhanced LOS communications with analog multi-path beamforming in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of enhanced LOS communications with analog multi-path beamforming as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first wireless device in accordance with examples as disclosed herein. For example, the communications manager 1020 may be configured as or otherwise support a means for transmitting, to a second wireless device, an indication of a capability of the first wireless device to concurrently transmit first signaling in a first analog beamforming direction using a first TCI state corresponding to a LOS mode and second signaling in a second analog beamforming direction using a second TCI state corresponding to an indirect LOS mode. The communications manager 1020 may be configured as or otherwise support a means for transmitting, to the second wireless device, a first message in the first analog beamforming direction using the first TCI state concurrently with a second message in the second analog beamforming direction using the second TCI state.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for enhancing LOS communications with analog multi-path beamforming, which may result in reduced processing, reduced power consumption, more efficient utilization of communication resources, or a combination thereof.

Figure 11:
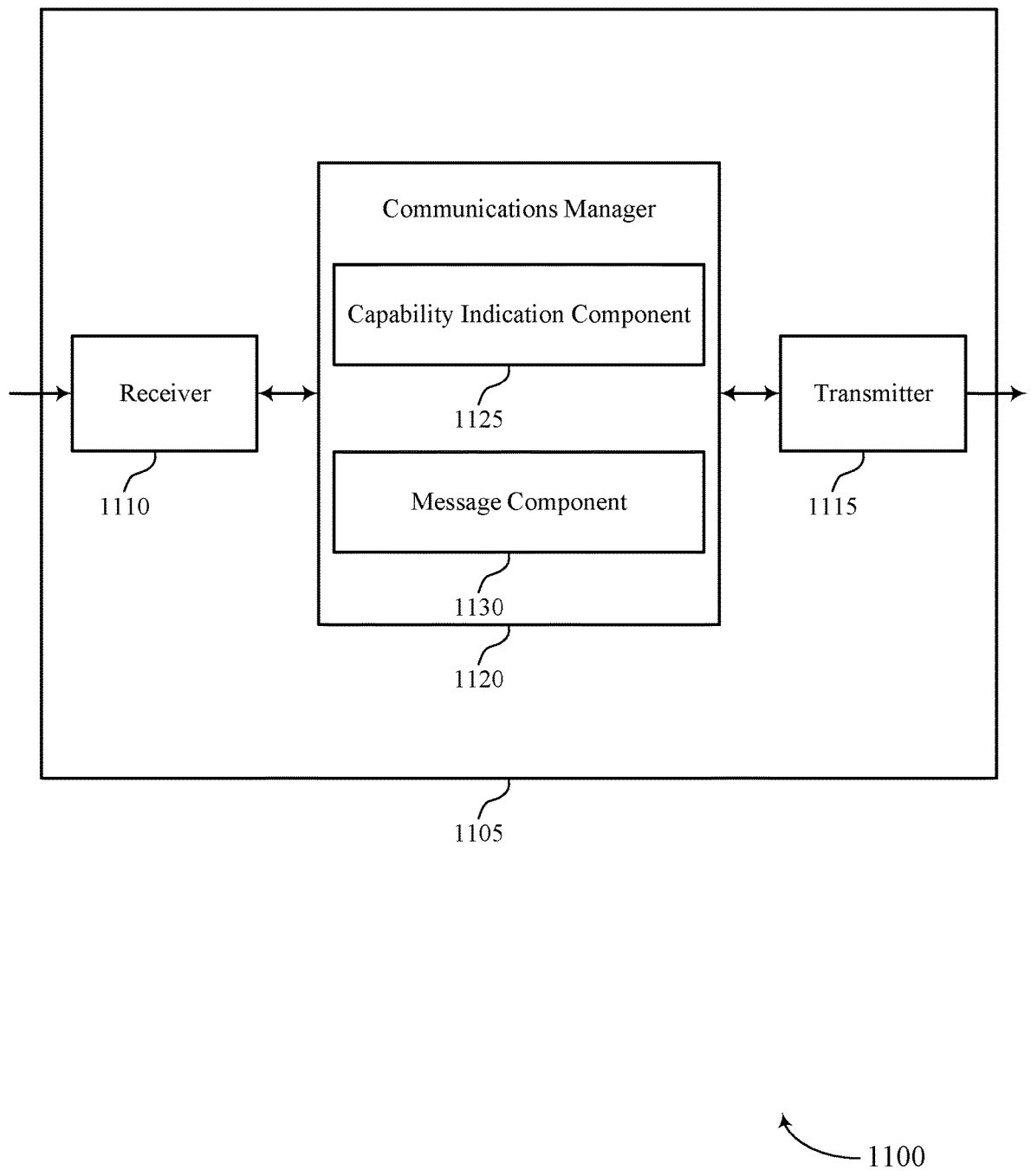

FIG. 11 illustrates a block diagram 1100 of a device 1105 that supports enhanced LOS communications with analog multi-path beamforming in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of enhanced LOS communications with analog multi-path beamforming as described herein. For example, the communications manager 1120 may include a capability indication component 1125 a message component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a first wireless device in accordance with examples as disclosed herein. The capability indication component 1125 may be configured as or otherwise support a means for transmitting, to a second wireless device, an indication of a capability of the first wireless device to concurrently transmit first signaling in a first analog beamforming direction using a first TCI state corresponding to a LOS mode and second signaling in a second analog beamforming direction using a second TCI state corresponding to an indirect LOS mode. The message component 1130 may be configured as or otherwise support a means for transmitting, to the second wireless device, a first message in the first analog beamforming direction using the first TCI state concurrently with a second message in the second analog beamforming direction using the second TCI state.

Figure 12:
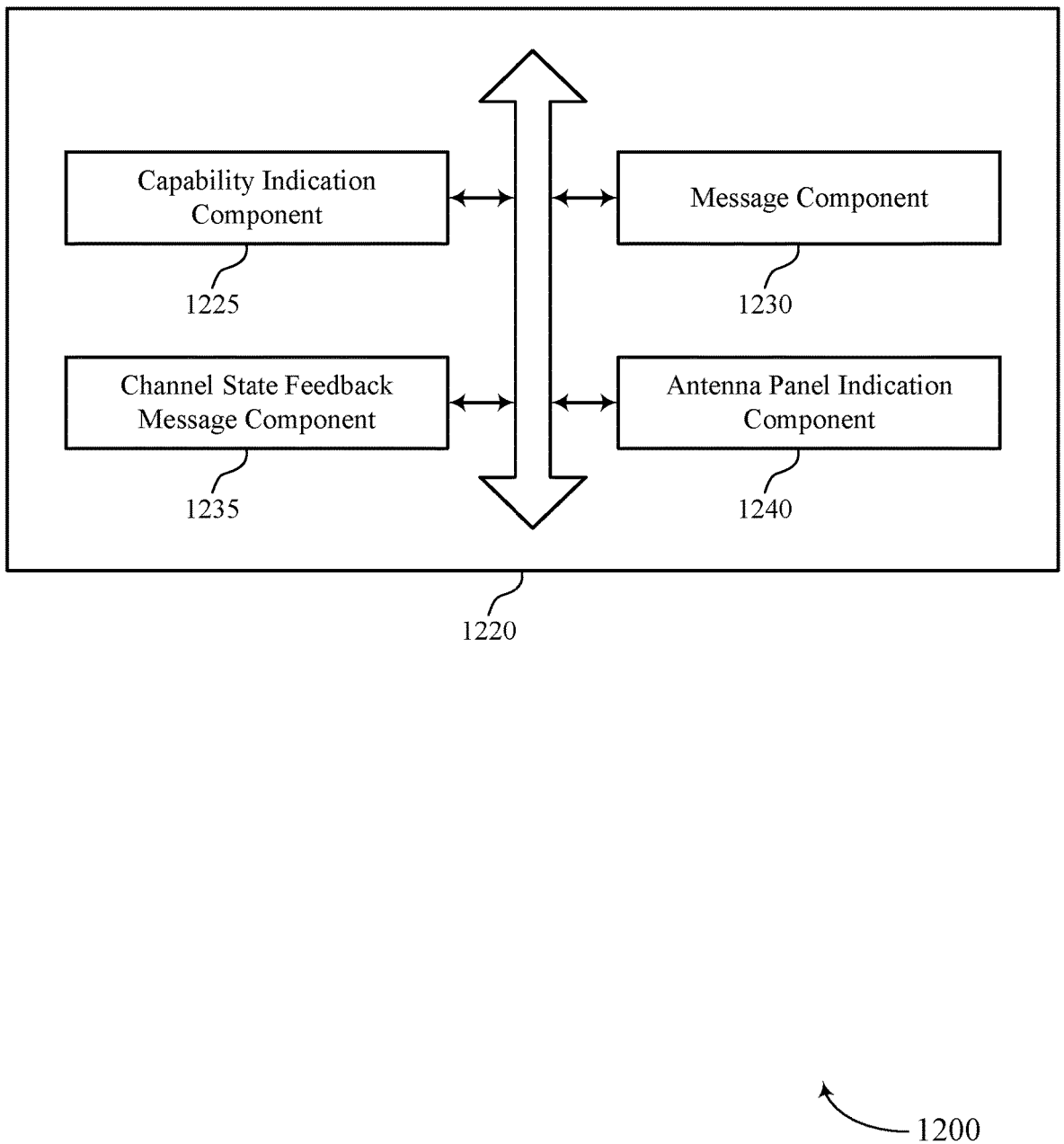
FIG. 12 illustrates a block diagram of a communications manager that supports enhanced LOS communications with analog multi-path beamforming in accordance with one or more aspects of the present disclosure.

FIG. 12 illustrates a block diagram 1200 of a communications manager 1220 that supports enhanced LOS communications with analog multi-path beamforming in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of enhanced LOS communications with analog multi-path beamforming as described herein. For example, the communications manager 1220 may include a capability indication component 1225, a message component 1230, a CSI feedback message component 1235, an antenna panel indication component 1240, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a first wireless device in accordance with examples as disclosed herein. The capability indication component 1225 may be configured as or otherwise support a means for transmitting, to a second wireless device, an indication of a capability of the first wireless device to concurrently transmit first signaling in a first analog beamforming direction using a first TCI state corresponding to a LOS mode and second signaling in a second analog beamforming direction using a second TCI state corresponding to an indirect LOS mode. The message component 1230 may be configured as or otherwise support a means for transmitting, to the second wireless device, a first message in the first analog beamforming direction using the first TCI state concurrently with a second message in the second analog beamforming direction using the second TCI state.

In some examples, the CSI feedback message component 1235 may be configured as or otherwise support a means for receiving, from the second wireless device, a CSI feedback message including one or more parameters associated with the first analog beamforming direction, the second analog beamforming direction, or both, where a first quantity of antenna panels associated with the LOS mode and a second quantity of antenna panels associated with the indirect LOS mode are based on the one or more parameters.

In some examples, the one or more parameters include a received signal strength measurement, a channel rank parameter corresponding to the first analog beamforming direction and the second analog beamforming direction, a link reliability parameter corresponding to the first analog beamforming direction and the second analog beamforming direction, or any combination thereof.

In some examples, the first message includes a first DMRS and the second message includes a second DMRS, and the message component 1230 may be configured as or otherwise support a means for transmitting a TCI message including QCL information that indicates the first analog beamforming direction and the second analog beamforming direction. In some examples, the first message includes a first DMRS and the second message includes a second DMRS, and the message component 1230 may be configured as or otherwise support a means for transmitting the first DMRS on a downlink data channel in the first analog beamforming direction, and the second DMRS on the downlink data channel in the second analog beamforming direction.

In some examples, to support transmitting the first DMRS and the second DMRS, the message component 1230 may be configured as or otherwise support a means for transmitting the first DMRS via a first DMRS port and the second DMRS via a second DMRS port based on the TCI message.

In some examples, the first DMRS port is associated with a first set of DMRS ports corresponding to the first analog beamforming direction of the LOS mode and the second DMRS port is associated with a second set of DMRS ports corresponding to the second analog beamforming direction of the indirect LOS mode.

In some examples, the message component 1230 may be configured as or otherwise support a means for receiving, from the second wireless device, a first uplink message in the first analog beamforming direction and a second uplink message in the second analog beamforming direction based on the TCI message.

In some examples, the antenna panel indication component 1240 may be configured as or otherwise support a means for transmitting, to the second wireless device, an indication of a first quantity of antenna panels available for communicating with the second wireless device in the first analog beamforming direction and a second quantity of antenna panels available for communicating with the second wireless device in the second analog beamforming direction.

In some examples, to support transmitting the first message in the first analog beamforming direction concurrently with the second message in the second analog beamforming direction, the message component 1230 may be configured as or otherwise support a means for transmitting the first message via a first set of multiple antenna elements corresponding to the LOS mode and the second message via a second set of multiple antenna elements corresponding to the indirect LOS mode.

In some examples, the first set of multiple antenna elements and the second set of multiple antenna elements are located at one or more antenna panels of the first wireless device.

In some examples, to support transmitting the first message in the first analog beamforming direction concurrently with the second message in the second analog beamforming direction, the message component 1230 may be configured as or otherwise support a means for transmitting the first message via a first set of antenna panels and the second message via a non-overlapping second set of antenna panels, where the first set of antenna panels correspond to the LOS mode and the non-overlapping second set of antenna panels correspond to the indirect LOS mode.

In some examples, each antenna panel of the first set of antenna panels and the non-overlapping second set of antenna panels is connected to one subset of antennas that includes a sub-array, a partial connection architecture, or both, implemented by the first wireless device.

In some examples, to support transmitting the first message in the first analog beamforming direction concurrently with the second message in the second analog beamforming direction, the message component 1230 may be configured as or otherwise support a means for transmitting the first message and the second message via a same set of antenna panels, where the first message corresponds to the LOS mode and the second message corresponds to the indirect LOS mode.

In some examples, each antenna panel of the same set of antenna panels is connected to multiple subsets of antennas or all antennas that includes a hybrid connection architecture or a full connection architecture implemented by the first wireless device.

Figure 13:
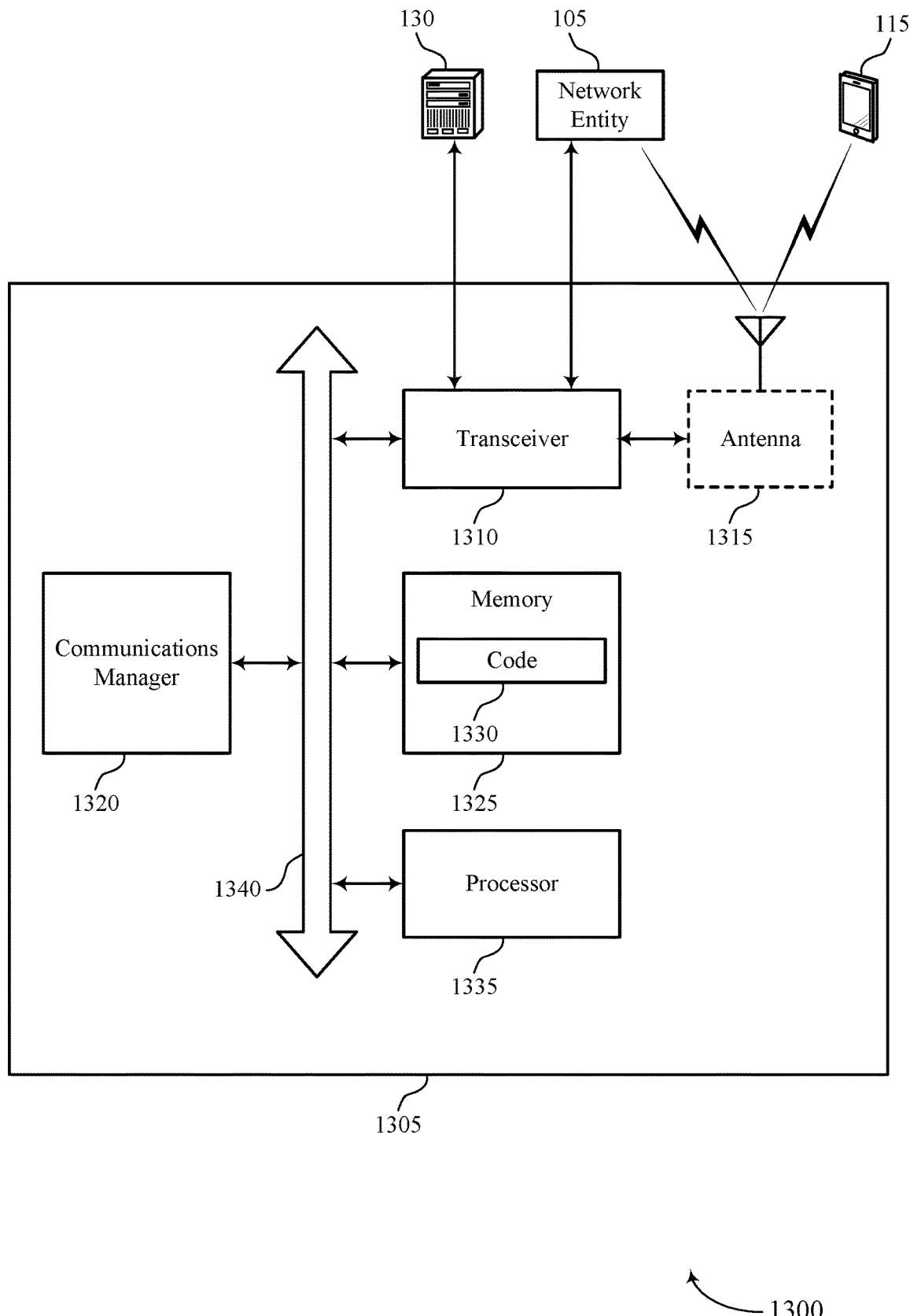
FIG. 13 illustrates a diagram of a system including a device that supports enhanced LOS communications with analog multi-path beamforming in accordance with one or more aspects of the present disclosure.

FIG. 13 illustrates a diagram of a system 1300 including a device 1305 that supports enhanced LOS communications with analog multi-path beamforming in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting enhanced LOS communications with analog multi-path beamforming). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a first wireless device in accordance with examples as disclosed herein. For example, the communications manager 1320 may be configured as or otherwise support a means for transmitting, to a second wireless device, an indication of a capability of the first wireless device to concurrently transmit first signaling in a first analog beamforming direction using a first TCI state corresponding to a LOS mode and second signaling in a second analog beamforming direction using a second TCI state corresponding to an indirect LOS mode. The communications manager 1320 may be configured as or otherwise support a means for transmitting, to the second wireless device, a first message in the first analog beamforming direction using the first TCI state concurrently with a second message in the second analog beamforming direction using the second TCI state.

By including or configuring the communications manager 1320 in accordance with examples as described herein, the device 1305 may support techniques for enhancing LOS communications with analog multi-path beamforming, which may result in improved communication reliability, reduced latency, improved user experience related to reduced processing, reduced power consumption, more efficient utilization of communication resources, improved coordination between devices, longer battery life, improved utilization of processing, or a combination thereof.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of enhanced LOS communications with analog multi-path beamforming as described herein, or the processor 1335 and the memory 1325 may be otherwise configured to perform or support such operations.

Figure 14:
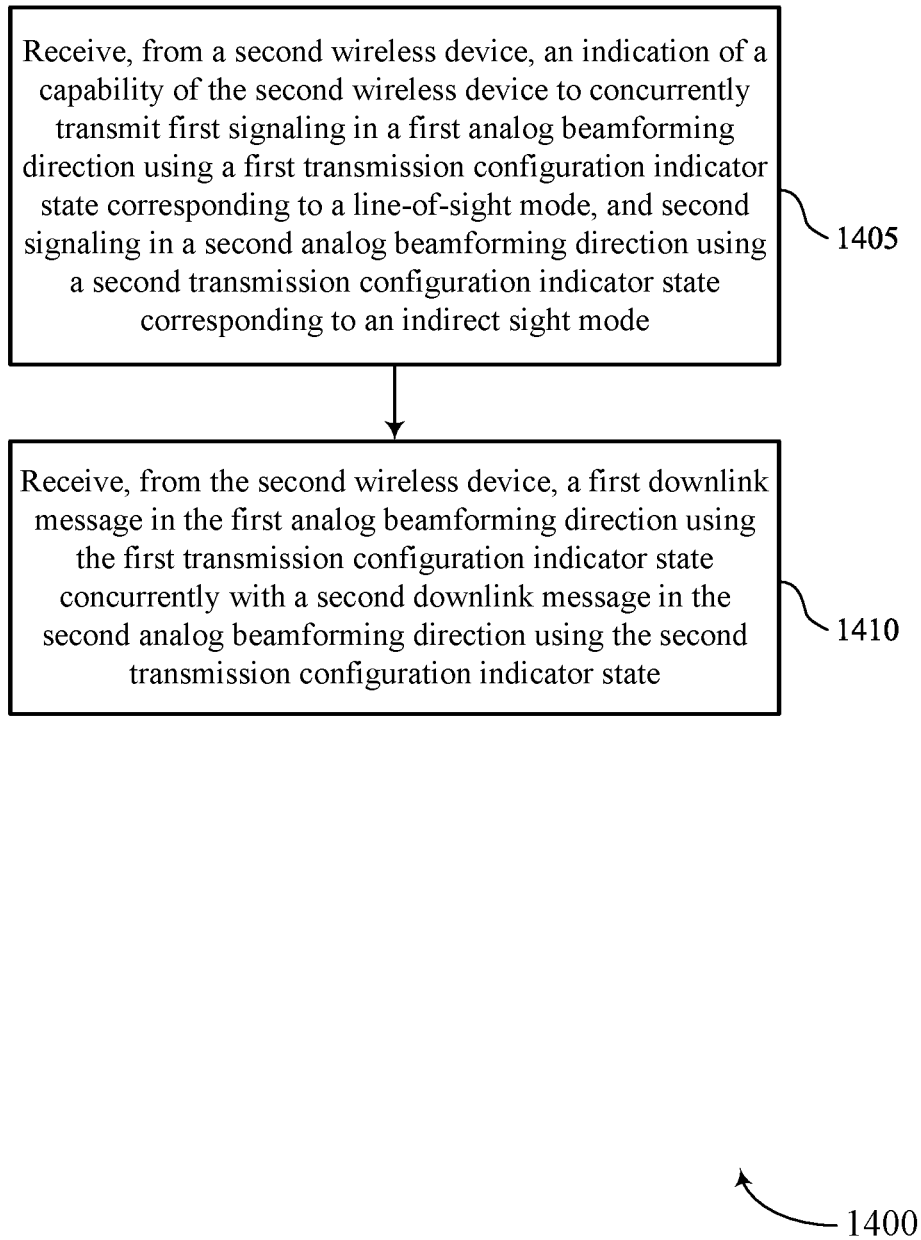
FIGS. 14 through 17 illustrate flowcharts showing methods that support enhanced LOS communications with analog multi-path beamforming in accordance with one or more aspects of the present disclosure.

FIG. 14 illustrates a flowchart showing a method 1400 that supports enhanced LOS communications with analog multi-path beamforming in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a second wireless device, an indication of a capability of the second wireless device to concurrently transmit first signaling in a first analog beamforming direction using a first TCI state corresponding to a LOS mode, and second signaling in a second analog beamforming direction using a second TCI state corresponding to an indirect LOS mode. The operations of 1405 may be performed in accordance with examples as disclosed herein. In some examples, aspects of the operations of 1405 may be performed by a capability indication component 825 as described with reference to FIG. 8.

At 1410, the method may include receiving, from the second wireless device, a first downlink message in the first analog beamforming direction using the first TCI state concurrently with a second downlink message in the second analog beamforming direction using the second TCI state. The operations of 1410 may be performed in accordance with examples as disclosed herein. In some examples, aspects of the operations of 1410 may be performed by a downlink message component 830 as described with reference to FIG. 8.

Figure 15:
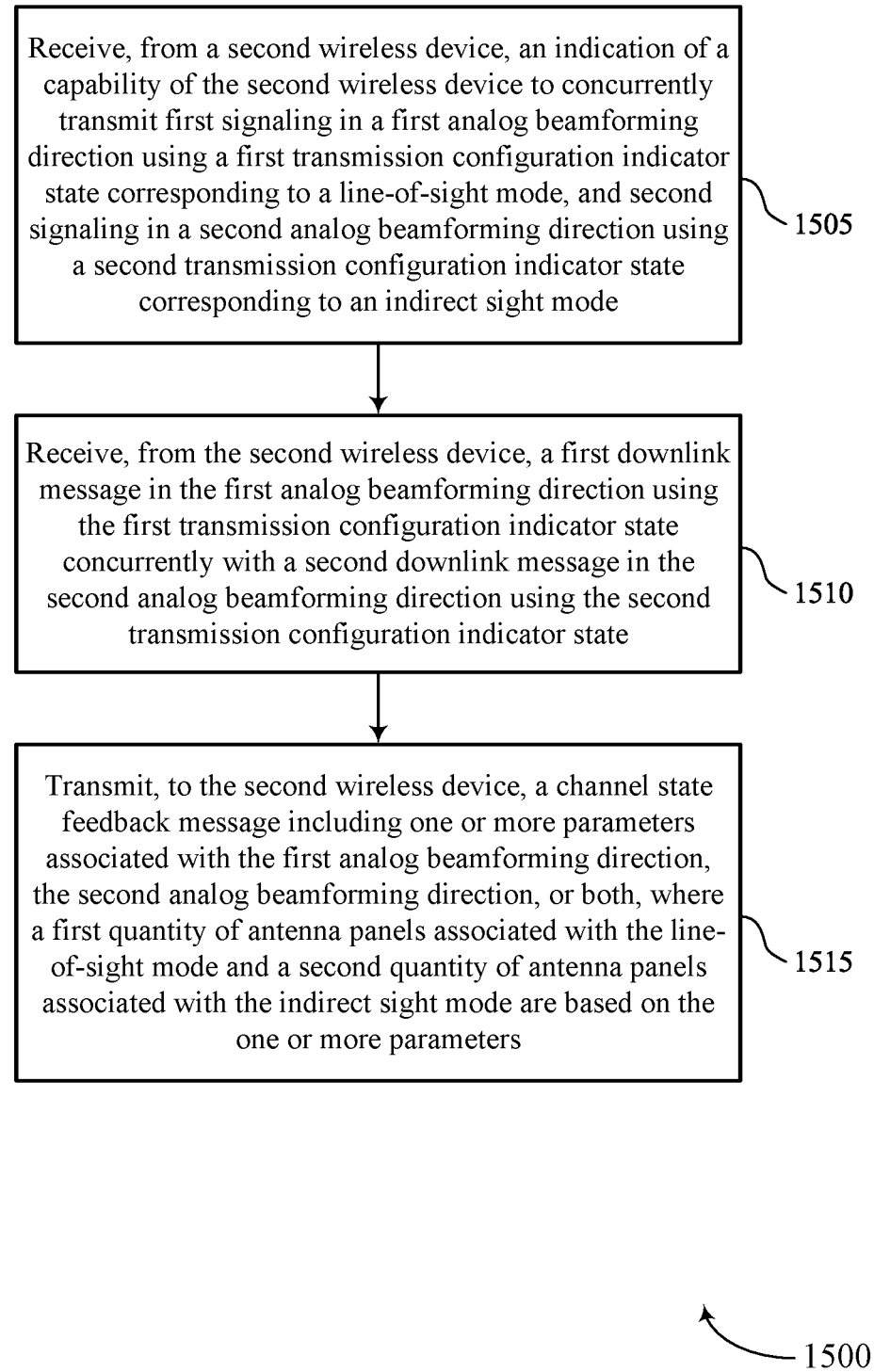

FIG. 15 illustrates a flowchart showing a method 1500 that supports enhanced LOS communications with analog multi-path beamforming in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions.

Additionally, or alternatively, the UE may perform aspects of the described functions using special-purpose hardware.

At 1505, the method may include receiving, from a second wireless device, an indication of a capability of the second wireless device to concurrently transmit first signaling in a first analog beamforming direction using a first TCI state corresponding to a LOS mode, and second signaling in a second analog beamforming direction using a second TCI state corresponding to an indirect LOS mode. The operations of 1505 may be performed in accordance with examples as disclosed herein. In some examples, aspects of the operations of 1505 may be performed by a capability indication component 825 as described with reference to FIG. 8.

At 1510, the method may include receiving, from the second wireless device, a first downlink message in the first analog beamforming direction using the first TCI state concurrently with a second downlink message in the second analog beamforming direction using the second TCI state. The operations of 1510 may be performed in accordance with examples as disclosed herein. In some examples, aspects of the operations of 1510 may be performed by a downlink message component 830 as described with reference to FIG. 8.

At 1515, the method may include transmitting, to the second wireless device, a CSI feedback message including one or more parameters associated with the first analog beamforming direction, the second analog beamforming direction, or both, where a first quantity of antenna panels associated with the LOS mode and a second quantity of antenna panels associated with the indirect LOS mode are based on the one or more parameters. The operations of 1515 may be performed in accordance with examples as disclosed herein. In some examples, aspects of the operations of 1515 may be performed by a CSI feedback message component 835 as described with reference to FIG. 8.

Figure 16:
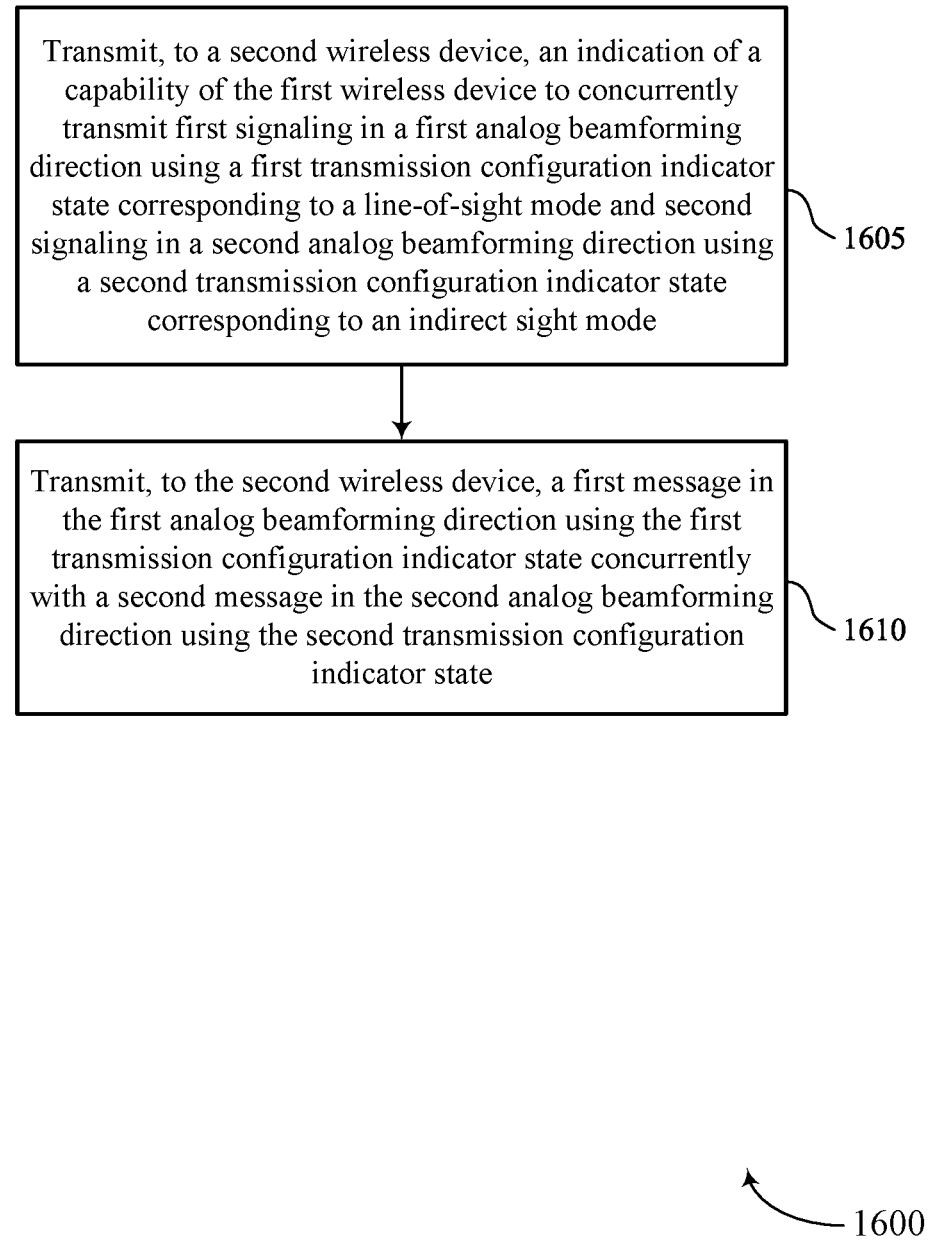

FIG. 16 illustrates a flowchart showing a method 1600 that supports enhanced LOS communications with analog multi-path beamforming in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a second wireless device, an indication of a capability of the first wireless device to concurrently transmit first signaling in a first analog beamforming direction using a first TCI state corresponding to a LOS mode and second signaling in a second analog beamforming direction using a second TCI state corresponding to an indirect LOS mode. The operations of 1605 may be performed in accordance with examples as disclosed herein. In some examples, aspects of the operations of 1605 may be performed by a capability indication component 1225 as described with reference to FIG. 12.

At 1610, the method may include transmitting, to the second wireless device, a first message in the first analog beamforming direction using the first TCI state concurrently with a second message in the second analog beamforming direction using the second TCI state. The operations of 1610 may be performed in accordance with examples as disclosed herein. In some examples, aspects of the operations of 1610 may be performed by a message component 1230 as described with reference to FIG. 12.

Figure 17:
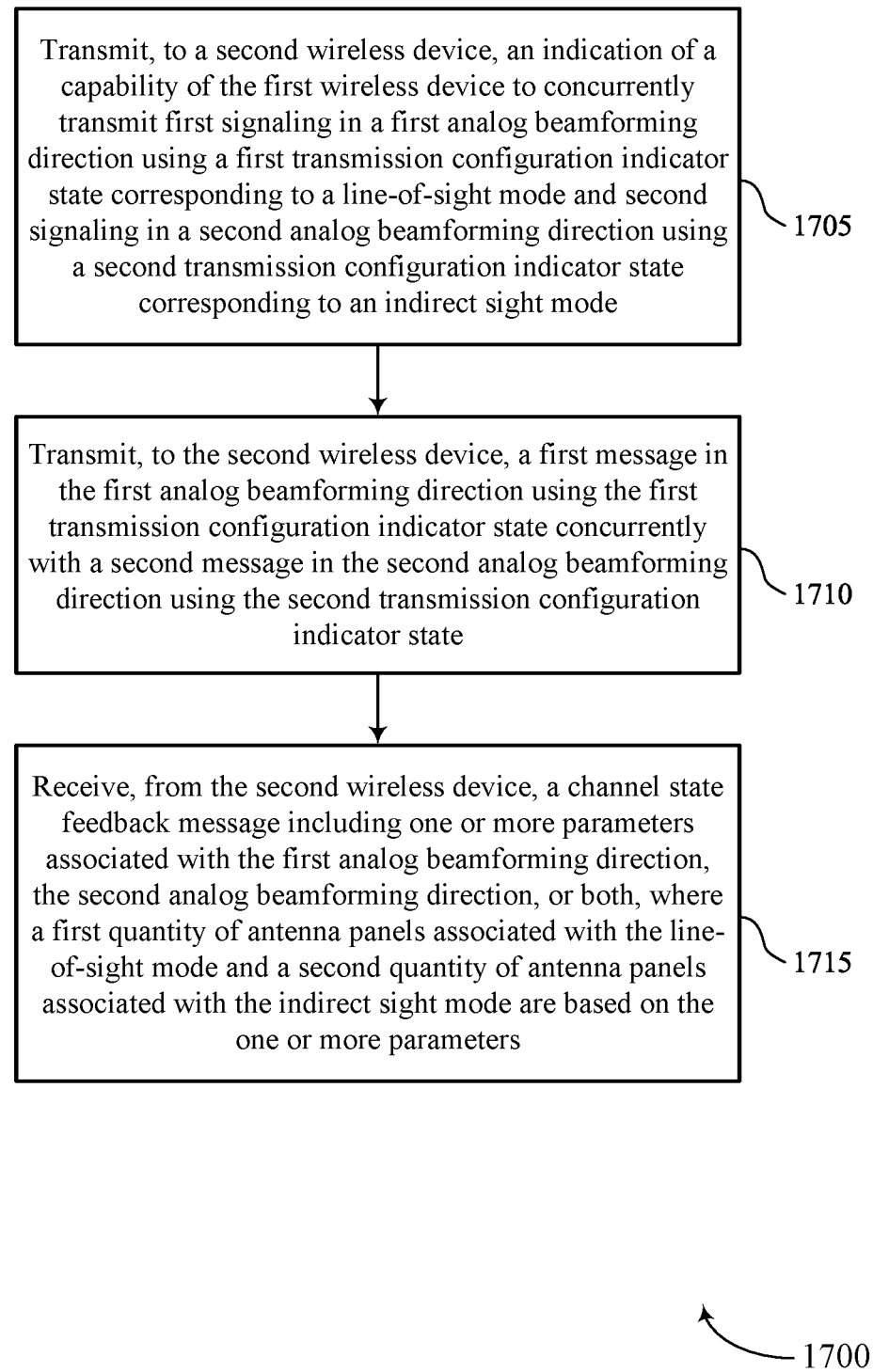

FIG. 17 illustrates a flowchart showing a method 1700 that supports enhanced LOS communications with analog multi-path beamforming in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a second wireless device, an indication of a capability of the first wireless device to concurrently transmit first signaling in a first analog beamforming direction using a first TCI state corresponding to a LOS mode and second signaling in a second analog beamforming direction using a second TCI state corresponding to an indirect LOS mode. The operations of 1705 may be performed in accordance with examples as disclosed herein. In some examples, aspects of the operations of 1705 may be performed by a capability indication component 1225 as described with reference to FIG. 12.

At 1710, the method may include transmitting, to the second wireless device, a first message in the first analog beamforming direction using the first TCI state concurrently with a second message in the second analog beamforming direction using the second TCI state. The operations of 1710 may be performed in accordance with examples as disclosed herein. In some examples, aspects of the operations of 1710 may be performed by a message component 1230 as described with reference to FIG. 12.

At 1715, the method may include receiving, from the second wireless device, a CSI feedback message including one or more parameters associated with the first analog beamforming direction, the second analog beamforming direction, or both, where a first quantity of antenna panels associated with the LOS mode and a second quantity of antenna panels associated with the indirect LOS mode are based on the one or more parameters. The operations of 1715 may be performed in accordance with examples as disclosed herein. In some examples, aspects of the operations of 1715 may be performed by a CSI feedback message component 1235 as described with reference to FIG. 12.

The following provides an overview of aspects of the present disclosure:

Aspect 1: A method for wireless communication at a first wireless device, comprising: receiving, from a second wireless device, an indication of a capability of the second wireless device to concurrently transmit first signaling in a first analog beamforming direction using a first TCI state corresponding to a LOS mode, and second signaling in a second analog beamforming direction using a second TCI state corresponding to an indirect LOS mode (e.g., NLOS); and receiving, from the second wireless device, a first downlink message in the first analog beamforming direction using the first TCI state concurrently with a second downlink message in the second analog beamforming direction using the second TCI state.

Aspect 2: The method of aspect 1, further comprising: transmitting, to the second wireless device, a CSI feedback message comprising one or more parameters associated with the first analog beamforming direction, the second analog beamforming direction, or both, wherein a first quantity of antenna panels associated with the LOS mode and a second quantity of antenna panels associated with the indirect LOS mode are based at least in part on the one or more parameters.

Aspect 3: The method of aspect 2, wherein the one or more parameters comprise a received signal strength measurement, a channel rank parameter corresponding to the first analog beamforming direction and the second analog beamforming direction, a link reliability parameter corresponding to the first analog beamforming direction and the second analog beamforming direction, or any combination thereof.

Aspect 4: The method of any of aspects 1 through 3, wherein the first downlink message comprises a first DMRS and the second downlink message comprises a second DMRS, the method further comprising: receiving a TCI message comprising quasi-colocation information that indicates the first analog beamforming direction and the second analog beamforming direction; and receiving, based at least in part on the TCI message, the first DMRS on a downlink data channel in the first analog beamforming direction, and the second DMRS on the downlink data channel in the second analog beamforming direction.

Aspect 5: The method of aspect 4, wherein receiving the first DMRS and the second DMRS comprises: receiving the first DMRS via a first DMRS port and the second DMRS via a second DMRS port based at least in part on the TCI message.

Aspect 6: The method of aspect 5, wherein the first DMRS port is associated with a first set of DMRS ports corresponding to the first analog beamforming direction of the LOS mode and the second DMRS port is associated with a second set of DMRS ports corresponding to the second analog beamforming direction of the indirect LOS mode.

Aspect 7: The method of any of aspects 4 through 6, further comprising: transmitting, to the second wireless device, a first uplink message in the first analog beamforming direction and a second uplink message in the second analog beamforming direction based at least in part on the TCI message.

Aspect 8: The method of any of aspects 1 through 7, further comprising: transmitting, to the second wireless device, an indication of a first quantity of antenna panels available for communicating with the second wireless device in the first analog beamforming direction and a second quantity of antenna panels available for communicating with the second wireless device in the second analog beamforming direction.

Aspect 9: The method of any of aspects 1 through 8, wherein receiving the first downlink message in the first analog beamforming direction concurrently with the second downlink message in the second analog beamforming direction further comprises: receiving the first downlink message via a first plurality of antenna elements corresponding to the LOS mode and the second downlink message via a second plurality of antenna elements corresponding to the indirect LOS mode.

Aspect 10: The method of aspect 9, wherein the first plurality of antenna elements and the second plurality of antenna elements are located at one or more antenna panels of the first wireless device.

Aspect 11: The method of any of aspects 1 through 10, wherein receiving the first downlink message in the first analog beamforming direction concurrently with the second downlink message in the second analog beamforming direction further comprises: receiving the first downlink message via a first set of antenna panels and the second downlink message via a non-overlapping second set of antenna panels, wherein the first set of antenna panels correspond to the LOS mode and the non-overlapping second set of antenna panels correspond to the indirect LOS mode.

Aspect 12: The method of aspect 11, wherein each antenna panel of the first set of antenna panels and the non-overlapping second set of antenna panels is connected to one subset of antennas that comprises a sub-array, a partial connection architecture, or both, implemented by the first wireless device.

Aspect 13: The method of any of aspects 1 through 12, wherein receiving the first downlink message in the first analog beamforming direction concurrently with the second downlink message in the second analog beamforming direction further comprises: receiving the first downlink message and the second downlink message concurrently via a same set of antenna panels, wherein the first downlink message corresponds to the LOS mode and the second downlink message corresponds to the indirect LOS mode.

Aspect 14: The method of aspect 13, wherein each antenna panel of the same set of antenna panels is connected to multiple subsets of antennas or all antennas that comprises a hybrid connection architecture or a full connection architecture implemented by the first wireless device.

Aspect 15: A method for wireless communication at a first wireless device, comprising: transmitting, to a second wireless device, an indication of a capability of the first wireless device to concurrently transmit first signaling in a first analog beamforming direction using a first TCI state corresponding to a LOS mode and second signaling in a second analog beamforming direction using a second TCI state corresponding to an indirect LOS mode; and transmitting, to the second wireless device, a first message in the first analog beamforming direction using the first TCI state concurrently with a second message in the second analog beamforming direction using the second TCI state.

Aspect 16: The method of aspect 15, further comprising: receiving, from the second wireless device, a CSI feedback message comprising one or more parameters associated with the first analog beamforming direction, the second analog beamforming direction, or both, wherein a first quantity of antenna panels associated with the LOS mode and a second quantity of antenna panels associated with the indirect LOS mode are based at least in part on the one or more parameters.

Aspect 17: The method of aspect 16, wherein the one or more parameters comprise a received signal strength measurement, a channel rank parameter corresponding to the first analog beamforming direction and the second analog beamforming direction, a link reliability parameter corresponding to the first analog beamforming direction and the second analog beamforming direction, or any combination thereof.

Aspect 18: The method of any of aspects 15 through 17, wherein the first message comprises a first DMRS and the second message comprises a second DMRS, the method further comprising: transmitting a TCI message comprising quasi-colocation information that indicates the first analog beamforming direction and the second analog beamforming direction; and transmitting the first DMRS on a downlink data channel in the first analog beamforming direction, and the second DMRS on the downlink data channel in the second analog beamforming direction.

Aspect 19: The method of aspect 18, wherein transmitting the first DMRS and the second DMRS comprises: transmitting the first DMRS via a first DMRS port and the second DMRS via a second DMRS port based at least in part on the TCI message.

Aspect 20: The method of aspect 19, wherein the first DMRS port is associated with a first set of DMRS ports corresponding to the first analog beamforming direction of the LOS mode and the second DMRS port is associated with a second set of DMRS ports corresponding to the second analog beamforming direction of the indirect LOS mode.

Aspect 21: The method of any of aspects 18 through 20, further comprising: receiving, from the second wireless device, a first uplink message in the first analog beamforming direction and a second uplink message in the second analog beamforming direction based at least in part on the TCI message.

Aspect 22: The method of any of aspects 15 through 21, further comprising: transmitting, to the second wireless device, an indication of a first quantity of antenna panels available for communicating with the second wireless device in the first analog beamforming direction and a second quantity of antenna panels available for communicating with the second wireless device in the second analog beamforming direction.

Aspect 23: The method of any of aspects 15 through 22, wherein transmitting the first message in the first analog beamforming direction concurrently with the second message in the second analog beamforming direction further comprises: transmitting the first message via a first plurality of antenna elements corresponding to the LOS mode and the second message via a second plurality of antenna elements corresponding to the indirect LOS mode.

Aspect 24: The method of aspect 23, wherein the first plurality of antenna elements and the second plurality of antenna elements are located at one or more antenna panels of the first wireless device.

Aspect 25: The method of any of aspects 15 through 24, wherein transmitting the first message in the first analog beamforming direction concurrently with the second message in the second analog beamforming direction further comprises: transmitting the first message via a first set of antenna panels and the second message via a non-overlapping second set of antenna panels, wherein the first set of antenna panels correspond to the LOS mode and the non-overlapping second set of antenna panels correspond to the indirect LOS mode.

Aspect 26: The method of aspect 25, wherein each antenna panel of the first set of antenna panels and the non-overlapping second set of antenna panels is connected to one subset of antennas that comprises a sub-array, a partial connection architecture, or both, implemented by the first wireless device.

Aspect 27: The method of any of aspects 15 through 26, wherein transmitting the first message in the first analog beamforming direction concurrently with the second message in the second analog beamforming direction further comprises: transmitting the first message and the second message via a same set of antenna panels, wherein the first message corresponds to the LOS mode and the second message corresponds to the indirect LOS mode.

Aspect 28: The method of aspect 27, wherein each antenna panel of the same set of antenna panels is connected to multiple subsets of antennas or all antennas that comprises a hybrid connection architecture or a full connection architecture implemented by the first wireless device.

Aspect 29: An apparatus for wireless communication at a first wireless device, comprising a processor; memory coupled with the processor; and instructions stored in the memory and executable by the processor to cause the apparatus to perform a method of any of aspects 1 through 14.

Aspect 30: An apparatus for wireless communication at a first wireless device, comprising at least one means for performing a method of any of aspects 1 through 14.

Aspect 31: A non-transitory computer-readable medium storing code for wireless communication at a first wireless device, the code comprising instructions executable by a processor to perform a method of any of aspects 1 through 14.

Aspect 32: An apparatus for wireless communication at a first wireless device, comprising a processor; memory coupled with the processor; and instructions stored in the memory and executable by the processor to cause the apparatus to perform a method of any of aspects 15 through 28.

Aspect 33: An apparatus for wireless communication at a first wireless device, comprising at least one means for performing a method of any of aspects 15 through 28.

Aspect 34: A non-transitory computer-readable medium storing code for wireless communication at a first wireless device, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first wireless device, comprising:
    a processor;
    memory coupled with the processor; and
    instructions stored in the memory and executable by the processor to cause the apparatus to:
        receive, from a second wireless device, an indication of a capability of the second wireless device to concurrently transmit first signaling in a first analog beamforming direction using a first transmission configuration indicator state corresponding to a line-of-sight mode, and second signaling in a second analog beamforming direction using a second transmission configuration indicator state corresponding to an indirect line-of-sight mode; and
        receive, from the second wireless device, a first downlink message in the first analog beamforming direction using the first transmission configuration indicator state concurrently with a second downlink message in the second analog beamforming direction using the second transmission configuration indicator state.

2. The apparatus of claim 1, wherein the instructions are further executable by the processor to cause the apparatus to:

transmit, to the second wireless device, a channel state information feedback message comprising one or more parameters associated with the first analog beamforming direction, the second analog beamforming direction, or both, wherein a first quantity of antenna panels associated with the line-of-sight mode and a second quantity of antenna panels associated with the indirect line-of-sight mode are based at least in part on the one or more parameters.

3. The apparatus of claim 2, wherein the one or more parameters comprise a received signal strength measurement, a channel rank parameter corresponding to the first analog beamforming direction and the second analog beamforming direction, a link reliability parameter corresponding to the first analog beamforming direction and the second analog beamforming direction, or any combination thereof.

4. The apparatus of claim 1, wherein the first downlink message comprises a first demodulation reference signal and the second downlink message comprises a second demodulation reference signal, and the instructions are further executable by the processor to cause the apparatus to:
receive a transmission configuration indication message comprising quasi-colocation information that indicates the first analog beamforming direction and the second analog beamforming direction; and
receive, based at least in part on the transmission configuration indication message, the first demodulation reference signal on a downlink data channel in the first analog beamforming direction, and the second demodulation reference signal on the downlink data channel in the second analog beamforming direction.

5. The apparatus of claim 4, wherein the instructions to receive the first demodulation reference signal and the second demodulation reference signal are executable by the processor to cause the apparatus to:
receive the first demodulation reference signal via a first demodulation reference signal port and the second demodulation reference signal via a second demodulation reference signal port based at least in part on the transmission configuration indication message.

6. The apparatus of claim 5, wherein the first demodulation reference signal port is associated with a first set of demodulation reference signal ports corresponding to the first analog beamforming direction of the line-of-sight mode and the second demodulation reference signal port is associated with a second set of demodulation reference signal ports corresponding to the second analog beamforming direction of the indirect line-of-sight mode.

7. The apparatus of claim 4, wherein the instructions are further executable by the processor to cause the apparatus to:
transmit, to the second wireless device, a first uplink message in the first analog beamforming direction and a second uplink message in the second analog beamforming direction based at least in part on the transmission configuration indication message.

8. The apparatus of claim 1, wherein the instructions are further executable by the processor to cause the apparatus to:
transmit, to the second wireless device, an indication of a first quantity of antenna panels available for communicating with the second wireless device in the first analog beamforming direction and a second quantity of antenna panels available for communicating with the second wireless device in the second analog beamforming direction.

9. The apparatus of claim 1, wherein the instructions to receive the first downlink message in the first analog beamforming direction concurrently with the second downlink message in the second analog beamforming direction are further executable by the processor to cause the apparatus to:
receive the first downlink message via a first plurality of antenna elements corresponding to the line-of-sight mode and the second downlink message via a second plurality of antenna elements corresponding to the indirect line-of-sight mode.

10. The apparatus of claim 9, wherein the first plurality of antenna elements and the second plurality of antenna elements are located at one or more antenna panels of the first wireless device.

11. The apparatus of claim 1, wherein the instructions to receive the first downlink message in the first analog beamforming direction concurrently with the second downlink message in the second analog beamforming direction are further executable by the processor to cause the apparatus to:
receive the first downlink message via a first set of antenna panels and the second downlink message via a non-overlapping second set of antenna panels, wherein the first set of antenna panels correspond to the line-of-sight mode and the non-overlapping second set of antenna panels correspond to the indirect line-of-sight mode.

12. The apparatus of claim 11, wherein each antenna panel of the first set of antenna panels and the non-overlapping second set of antenna panels is connected to one subset of antennas that comprises a sub-array, a partial connection architecture, or both, implemented by the first wireless device.

13. The apparatus of claim 1, wherein the instructions to receive the first downlink message in the first analog beamforming direction concurrently with the second downlink message in the second analog beamforming direction are further executable by the processor to cause the apparatus to:
receive the first downlink message and the second downlink message concurrently via a same set of antenna panels, wherein the first downlink message corresponds to the line-of-sight mode and the second downlink message corresponds to the indirect line-of-sight mode.

14. The apparatus of claim 13, wherein each antenna panel of the same set of antenna panels is connected to multiple subsets of antennas or all antennas that comprises a hybrid connection architecture or a full connection architecture implemented by the first wireless device.

15. An apparatus for wireless communication at a first wireless device, comprising:
a processor;
memory coupled with the processor; and
instructions stored in the memory and executable by the processor to cause the apparatus to:
transmit, to a second wireless device, an indication of a capability of the first wireless device to concurrently transmit first signaling in a first analog beamforming direction using a first transmission configuration indicator state corresponding to a line-of-sight mode and second signaling in a second analog beamforming direction using a second transmission configuration indicator state corresponding to an indirect line-of-sight mode; and
transmit, to the second wireless device, a first message in the first analog beamforming direction using the first transmission configuration indicator state concurrently with a second message in the second analog beamforming direction using the second transmission configuration indicator state.

16. The apparatus of claim 15, wherein the instructions are further executable by the processor to cause the apparatus to:
- receive, from the second wireless device, a channel state information feedback message comprising one or more parameters associated with the first analog beamforming direction, the second analog beamforming direction, or both, wherein a first quantity of antenna panels associated with the line-of-sight mode and a second quantity of antenna panels associated with the indirect line-of-sight mode are based at least in part on the one or more parameters.

17. The apparatus of claim 16, wherein the one or more parameters comprise a received signal strength measurement, a channel rank parameter corresponding to the first analog beamforming direction and the second analog beamforming direction, a link reliability parameter corresponding to the first analog beamforming direction and the second analog beamforming direction, or any combination thereof.

18. The apparatus of claim 15, wherein the first message comprises a first demodulation reference signal and the second message comprises a second demodulation reference signal, and the instructions are further executable by the processor to cause the apparatus to:
- transmit a transmission configuration indication message comprising quasi-colocation information that indicates the first analog beamforming direction and the second analog beamforming direction; and
- transmit the first demodulation reference signal on a downlink data channel in the first analog beamforming direction, and the second demodulation reference signal on the downlink data channel in the second analog beamforming direction.

19. The apparatus of claim 18, wherein the instructions to transmit the first demodulation reference signal and the second demodulation reference signal are executable by the processor to cause the apparatus to:
- transmit the first demodulation reference signal via a first demodulation reference signal port and the second demodulation reference signal via a second demodulation reference signal port based at least in part on the transmission configuration indication message.

20. The apparatus of claim 19, wherein the first demodulation reference signal port is associated with a first set of demodulation reference signal ports corresponding to the first analog beamforming direction of the line-of-sight mode and the second demodulation reference signal port is associated with a second set of demodulation reference signal ports corresponding to the second analog beamforming direction of the indirect line-of-sight mode.

21. The apparatus of claim 18, wherein the instructions are further executable by the processor to cause the apparatus to:
- receive, from the second wireless device, a first uplink message in the first analog beamforming direction and a second uplink message in the second analog beamforming direction based at least in part on the transmission configuration indication message.

22. The apparatus of claim 15, wherein the instructions are further executable by the processor to cause the apparatus to:
- transmit, to the second wireless device, an indication of a first quantity of antenna panels available for communicating with the second wireless device in the first analog beamforming direction and a second quantity of antenna panels available for communicating with the second wireless device in the second analog beamforming direction.

23. The apparatus of claim 15, wherein the instructions to transmit the first message in the first analog beamforming direction concurrently with the second message in the second analog beamforming direction are further executable by the processor to cause the apparatus to:
- transmit the first message via a first plurality of antenna elements corresponding to the line-of-sight mode and the second message via a second plurality of antenna elements corresponding to the indirect line-of-sight mode.

24. The apparatus of claim 23, wherein the first plurality of antenna elements and the second plurality of antenna elements are located at one or more antenna panels of the first wireless device.

25. The apparatus of claim 15, wherein the instructions to transmit the first message in the first analog beamforming direction concurrently with the second message in the second analog beamforming direction are further executable by the processor to cause the apparatus to:
- transmit the first message via a first set of antenna panels and the second message via a non-overlapping second set of antenna panels, wherein the first set of antenna panels correspond to the line-of-sight mode and the non-overlapping second set of antenna panels correspond to the indirect line-of-sight mode.

26. The apparatus of claim 25, wherein each antenna panel of the first set of antenna panels and the non-overlapping second set of antenna panels is connected to one subset of antennas that comprises a sub-array, a partial connection architecture, or both, implemented by the first wireless device.

27. The apparatus of claim 15, wherein the instructions to transmit the first message in the first analog beamforming direction concurrently with the second message in the second analog beamforming direction are further executable by the processor to cause the apparatus to:
- transmit the first message and the second message via a same set of antenna panels, wherein the first message corresponds to the line-of-sight mode and the second message corresponds to the indirect line-of-sight mode.

28. The apparatus of claim 27, wherein each antenna panel of the same set of antenna panels is connected to multiple subsets of antennas or all antennas that comprises a hybrid connection architecture or a full connection architecture implemented by the first wireless device.

29. A method for wireless communication at a first wireless device, comprising:
- receiving, from a second wireless device, an indication of a capability of the second wireless device to concurrently transmit first signaling in a first analog beamforming direction using a first transmission configuration indicator state corresponding to a line-of-sight mode, and second signaling in a second analog beamforming direction using a second transmission configuration indicator state corresponding to an indirect line-of-sight mode; and
- receiving, from the second wireless device, a first downlink message in the first analog beamforming direction using the first transmission configuration indicator state concurrently with a second downlink message in the second analog beamforming direction using the second transmission configuration indicator state.

30. A method for wireless communication at a first wireless device, comprising:

transmitting, to a second wireless device, an indication of a capability of the first wireless device to concurrently transmit first signaling in a first analog beamforming direction using a first transmission configuration indicator state corresponding to a line-of-sight mode and second signaling in a second analog beamforming direction using a second transmission configuration indicator state corresponding to an indirect line-of-sight mode; and transmitting, to the second wireless device, a first message in the first analog beamforming direction using the first transmission configuration indicator state concurrently with a second message in the second analog beamforming direction using the second transmission configuration indicator state.

* * * * *